(12) United States Patent
Lee et al.

(10) Patent No.: US 12,517,244 B2
(45) Date of Patent: Jan. 6, 2026

(54) APPARATUS FOR DRIVER ASSISTANCE AND METHOD OF CONTROLLING THE SAME

(71) Applicant: HL Klemove Corp., Incheon (KR)

(72) Inventors: Jingu Lee, Ansan-si (KR); Junghwan Choi, Seoul (KR); Hanbyul Lee, Seoul (KR)

(73) Assignee: HL Klemove Corp., Incheon (KR)

(*) Notice: Subject to any disclaimer, the term of this patent is extended or adjusted under 35 U.S.C. 154(b) by 331 days.

(21) Appl. No.: 18/234,552

(22) Filed: Aug. 16, 2023

(65) Prior Publication Data

US 2024/0241248 A1 Jul. 18, 2024

(30) Foreign Application Priority Data

Jan. 16, 2023 (KR) .................. 10-2023-0006089

(51) Int. Cl.
*G01S 13/931* (2020.01)
*G01S 7/35* (2006.01)

(52) U.S. Cl.
CPC ............ *G01S 13/931* (2013.01); *G01S 7/356* (2021.05); *G01S 2013/932* (2020.01)

(58) Field of Classification Search
CPC .. G01S 13/931; G01S 7/356; G01S 2013/932; G01S 7/354; G01S 13/584;
(Continued)

(56) References Cited

U.S. PATENT DOCUMENTS

2019/0011548 A1* 1/2019 Han .................. G01S 13/582
2023/0010398 A1* 1/2023 Wall .................. G01S 13/103

FOREIGN PATENT DOCUMENTS

| EP | 3796038 A1 * | 3/2021 | ........... G01S 13/931 |
|---|---|---|---|
| JP | 2011112373 A * | 6/2011 | ............ G01S 13/95 |
| KR | 10-2016-0066413 A | 6/2016 | |

OTHER PUBLICATIONS

JP 2011112373 A English Translation (Year: 2011).*

* cited by examiner

*Primary Examiner* — Vladimir Magloire
*Assistant Examiner* — Naomi M Wolford
(74) *Attorney, Agent, or Firm* — Harvest IP Law, LLP

(57) ABSTRACT

Disclosed herein is an apparatus for driver assistance including a radar. The apparatus may include a radar installed on a vehicle, having a sensing area outside the vehicle, and configured to provide object data, and configured to provide object data, and a controller configured to identify a distance to an object around the vehicle and a moving velocity of the object based on processing the object data. The radar includes an antenna array, and a processor configured to provide the antenna array with a first pre-chirp signal corresponding to a plurality of first pre-chirps and a first main chirp signal corresponding to a plurality of first main chirps, and provide the antenna array with a second pre-chirp signal corresponding to a plurality of second pre-chirps and a second main chirp signal corresponding to a plurality of second main chirps based on overlapping distances or velocities of different objects identified by the first pre-chirp signal or the first main chirp signal. A time interval between the plurality of second pre-chirps is different from a time interval between the plurality of first pre-chirps, and a time interval between the plurality of second main chirps is different from a time interval between the plurality of first main chirps.

20 Claims, 15 Drawing Sheets

(58) Field of Classification Search
CPC .. G01S 13/343; G01S 7/40; G01S 2013/0245; B60W 40/02; B60W 2420/408
See application file for complete search history.

APPARATUS FOR DRIVER ASSISTANCE AND METHOD OF CONTROLLING THE SAME

CROSS-REFERENCE TO RELATED APPLICATION

This application claims the benefit of Korean Patent Application No. 10-2023-0006089, filed on Jan. 16, 2023 in the Korean Intellectual Property Office, the disclosure of which is incorporated herein by reference.

BACKGROUND

1. Field

Embodiments of the present disclosure relate to an apparatus including a radar and a method of controlling the same.

2. Description of the Related Art

Vehicles are the most common transportation in modern society, and the number of people using vehicles is increasing. Although there are advantages such as easy long-distance movement and comfortable living with the development of a vehicle technology, a problem that road traffic conditions degrade and traffic congestion becomes serious in densely populated places such as Korea often occurs.

Recently, research on vehicles equipped with an advanced driver assist system (ADAS) for actively providing information on a vehicle condition, a driver condition, and/or a surrounding environment in order to reduce a driver's burden and enhance convenience is actively progressing.

As examples of ADASs mounted on the vehicle, there are lane departure warning (LDW), lane keeping assist (LKA), high beam assist (HBA), autonomous emergency braking (AEB), traffic sign recognition (TSR), adaptive cruise control (ACC), blind spot detection (BSD), etc.

An ADAS may collect information on a surrounding environment and process the collected information. In addition, the ADAS may recognize objects and design a route for the vehicle to travel based on processing the collected information.

As described above, since the mechanical connection between a steering wheel and a rack bar is omitted, a separate sensor for detecting a linear motion of the rack bar is required.

SUMMARY

Therefore, it is an aspect of the present disclosure to provide an apparatus including a radar and a method of controlling the same.

Additional aspects of the disclosure will be set forth in part in the description which follows and, in part, will be obvious from the description, or may be learned by practice of the disclosure.

In accordance with one aspect of the present disclosure, an apparatus for driver assistance includes a radar installed on a vehicle, having a sensing area outside the vehicle, and configured to provide object data, and configured to provide object data, and a controller configured to identify a distance to an object around the vehicle and a moving velocity of the object based on processing the object data. The radar includes an antenna array, and a processor configured to provide the antenna array with a first pre-chirp signal corresponding to a plurality of first pre-chirps and a first main chirp signal corresponding to a plurality of first main chirps, and provide the antenna array with a second pre-chirp signal corresponding to a plurality of second pre-chirps and a second main chirp signal corresponding to a plurality of second main chirps based on overlapping distances or velocities of different objects identified by the first pre-chirp signal or the first main chirp signal. A time interval between the plurality of second pre-chirps is different from a time interval between the plurality of first pre-chirps, and a time interval between the plurality of second main chirps is different from a time interval between the plurality of first main chirps.

The time interval between the plurality of first pre-chirps may be different from the time interval between the plurality of first main chirps, and the time interval between the plurality of second pre-chirps may be different from the time interval between the plurality of second main chirps.

The processor may identify a distance or velocity of each of the different objects based on a first pre-intermediate frequency signal corresponding to the first pre-chirp signal, and provide the second pre-chirp signal and the second main chirp signal to the antenna array when one or more of the distances or velocities of the different objects overlap.

The processor may identify a distance or velocity of each of the different objects based on a first main intermediate frequency signal corresponding to the first main chirp signal, and provide the second pre-chirp signal and the second main chirp signal to the antenna array when one or more of the distances or velocities of the different objects overlap.

The processor may alternately perform providing the first pre-chirp signal and the first main chirp signal to the antenna array and providing the second pre-chirp signal and the second main chirp signal to the antenna array.

A frequency of the first pre-chirp signal may be changed depending on each of the plurality of first pre-chirps, a frequency of the first main chirp signal may be changed depending on each of the plurality of first main chirps, a frequency of the second pre-chirp signal may be changed depending on each of the plurality of second pre-chirps, and a frequency of the second main chirp signal may be changed depending on each of the plurality of second main chirps.

The processor may provide object data including the distance or velocity of the object based on a first pre-intermediate frequency signal corresponding to the first pre-chirp signal and provide a bin mask corresponding to at least one bin not including data on the distance of the object.

The processor may transform the first pre-intermediate frequency signal into first frequency domain data through a first Fast Fourier Transform, transform the first frequency domain data into first phase domain data through a second Fast Fourier Transform, and provide object data including the distance and the velocity of the object based on the first phase domain data.

The processor may filter a second main intermediate frequency signal corresponding to the second main chirp signal using the bin mask, and provide the object data including the distance or velocity of the object based on the filtered intermediate frequency signal.

The processor may transform the second pre-intermediate frequency signal into second frequency domain data through a first Fast Fourier Transform, transform the second frequency domain data into second phase domain data through a second Fast Fourier Transform, and provide the object data including the distance and the velocity of the object based on the second phase domain data.

In accordance with another aspect of the present disclosure, a method of controlling an apparatus for driver assistance including an antenna array installed on a vehicle and having a sensing area outside the vehicle includes providing the antenna array with a first pre-chirp signal corresponding to a plurality of first pre-chirps and a first main chirp signal corresponding to a plurality of first main chirps, and providing the antenna array with a second pre-chirp signal corresponding to a plurality of second pre-chirps and a second main chirp signal corresponding to a plurality of second main chirps based on overlapping distances or velocities of different objects identified by the first pre-chirp signal or the first main chirp signal. A time interval between the plurality of second pre-chirps is different from a time interval between the plurality of first pre-chirps, and a time interval between the plurality of second main chirps is different from a time interval between the plurality of first main chirps.

The time interval between the plurality of first pre-chirps may be different from the time interval between the plurality of first main chirps. The time interval between the plurality of second pre-chirps may be different from the time interval between the plurality of second main chirps.

The providing of the second pre-chirp signal and the second main chirp signal to the antenna array may include identifying a distance or velocity of each of the different objects based on a first pre-intermediate frequency signal corresponding to the first pre-chirp signal, and providing the second pre-chirp signal and the second main chirp signal to the antenna array when one or more of the distances or velocities of the different objects overlap.

The providing of the second pre-chirp signal and the second main chirp signal to the antenna array may include identifying a distance or velocity of each of the different objects based on a first main intermediate frequency signal corresponding to the first main chirp signal, and providing the second pre-chirp signal and the second main chirp signal to the antenna array when one or more of the distances or velocities of the different objects overlap.

The method may further include alternately performing providing the antenna array with the first pre-chirp signal and the first main chirp signal and providing the antenna array with the second pre-chirp signal and the second main chirp signal.

A frequency of the first pre-chirp signal may be changed depending on each of the plurality of first pre-chirps. A frequency of the first main chirp signal may be changed depending on each of the plurality of first main chirps. A frequency of the second pre-chirp signal may be changed depending on each of the plurality of second pre-chirps. A frequency of the second main chirp signal may be changed depending on each of the plurality of second main chirps.

The method may further include providing object data including the distance or velocity of the object based on a first pre-intermediate frequency signal corresponding to the first pre-chirp signal, and providing a bin mask corresponding to at least one bin not including data on the distance of the object.

The providing of the object data including the distance or velocity of the object may include transforming the first pre-intermediate frequency signal into first frequency domain data through a first Fast Fourier Transform, transforming the first frequency domain data into first phase domain data through a second Fast Fourier Transform, and providing object data including the distance and the velocity of the object based on the first phase domain data.

The method may further include filtering a second main intermediate frequency signal corresponding to the second main chirp signal using the bin mask, and providing the object data including the distance or velocity of the object based on the filtered intermediate frequency signal.

The providing of the object data including the distance or velocity of the object may include transforming the second pre-intermediate frequency signal into second frequency domain data through a first Fast Fourier Transform, transforming the second frequency domain data into second phase domain data through a second Fast Fourier Transform, and providing object data including the distance and the velocity of the object based on the second phase domain data.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
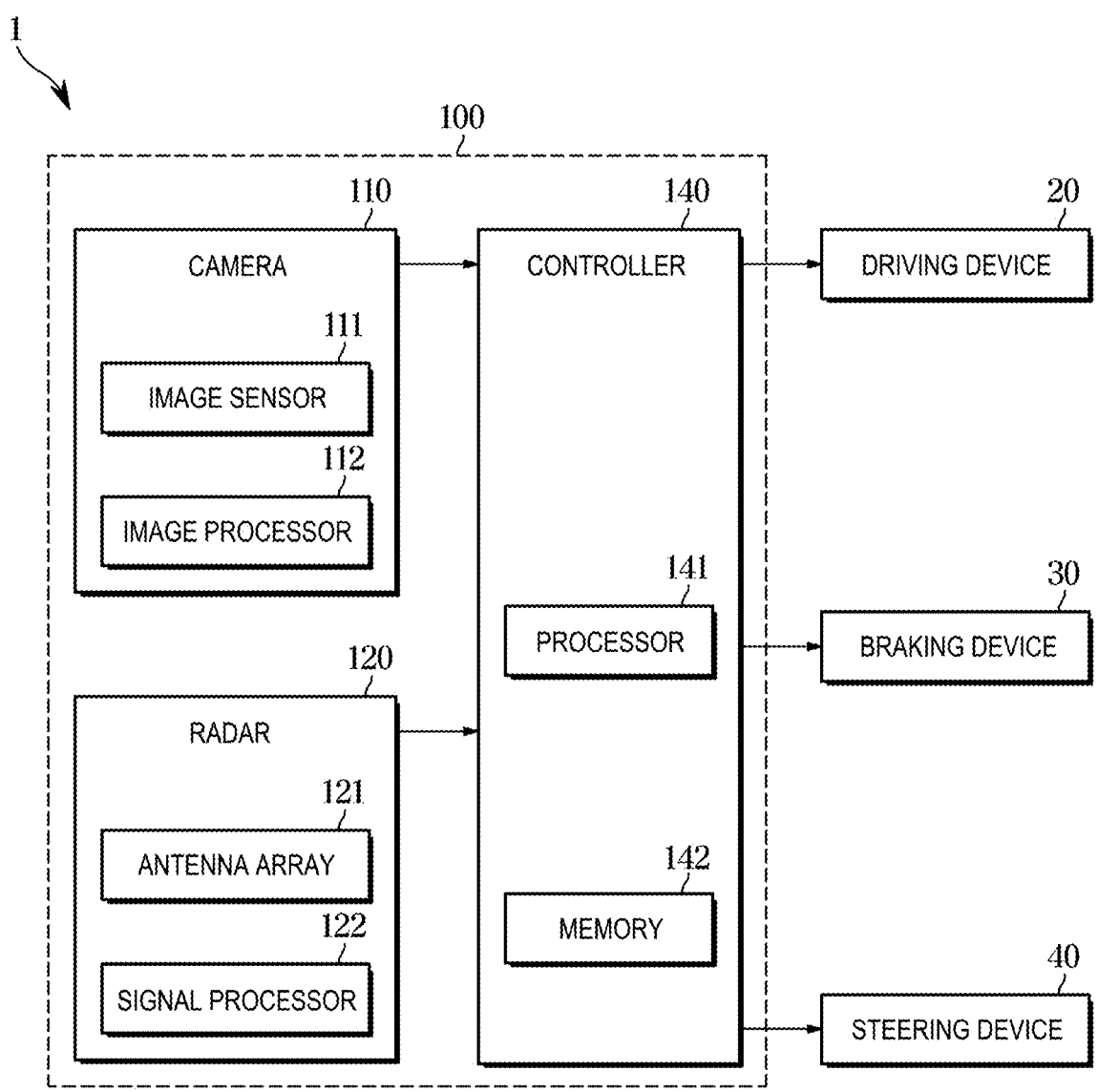
FIG. 1 is a view illustrating configurations of a vehicle and a traveling assistance apparatus according to one embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 2:
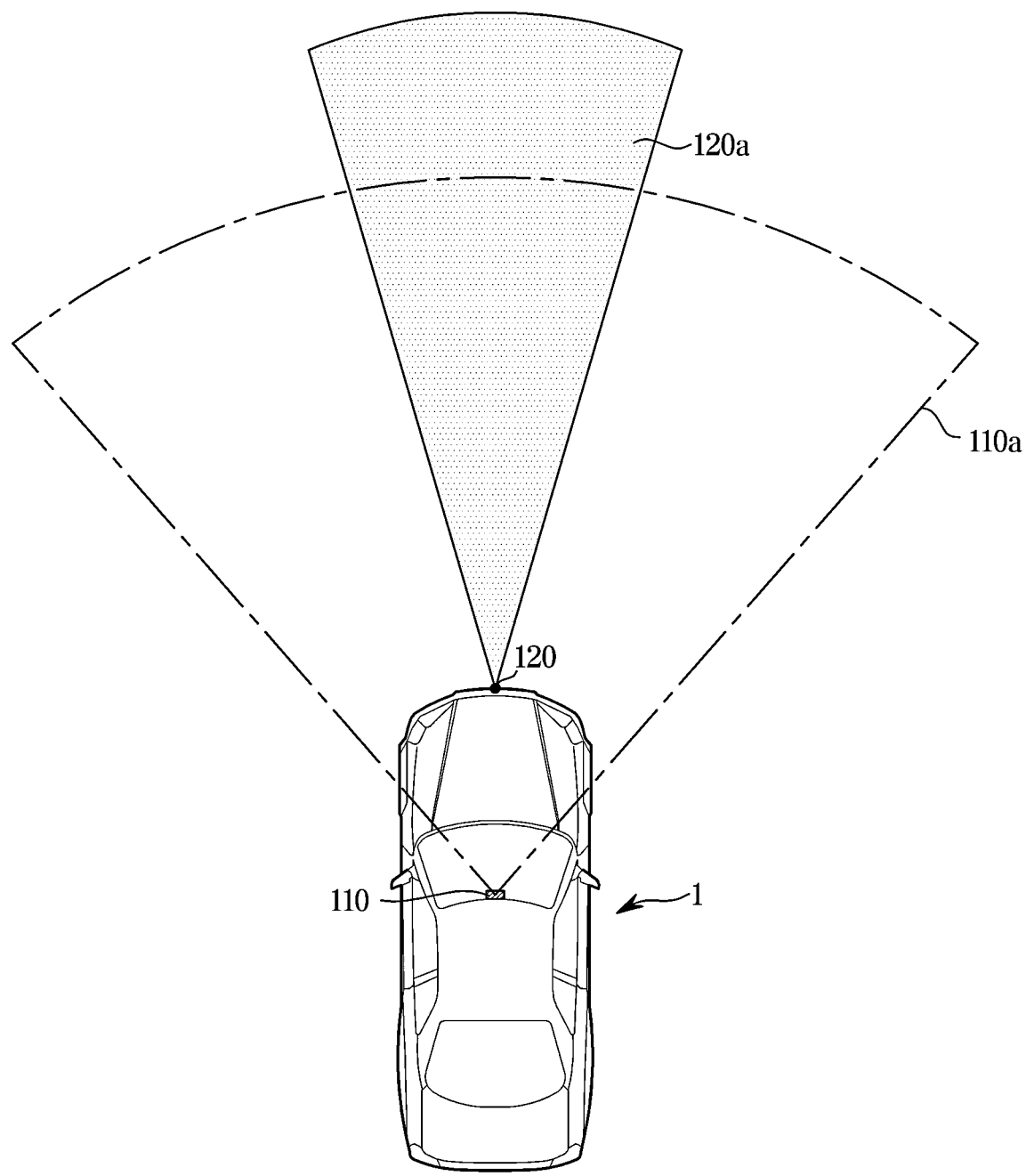
FIG. 2 is a view illustrating fields of view of a camera and a radar included in the traveling assistance apparatus according to one embodiment.

FIG. 1 is a view illustrating a configuration of a vehicle according to one embodiment. FIG. 2 is a view illustrating fields of view of a camera and a radar included in the traveling assistance apparatus according to one embodiment.

As illustrated in FIG. 1, a vehicle 1 includes a driving device 20, a braking device 30, a steering device 40, and a traveling assistance apparatus 100. The driving device 20, the braking device 30, the steering device 40, and/or the traveling assistance apparatus 100 may communicate with one another via a vehicle communication network NT. For example, the electric devices 20, 30, 40, and 100 included in the vehicle 1 may transmit or receive data via Ethernet, media oriented systems transport (MOST), Flexray, controller area network (CAN), local interconnect network (LIN), or the like.

The driving device 20 may move the vehicle 1 and include, for example, an engine, an engine management system (EMS), a transmission, and a transmission control unit (TCU). The engine may generate a power for the vehicle 1 to travel, and the EMS may control the engine in response to a driver's acceleration intention through an accelerator pedal or a request of the traveling assistance apparatus 100. The transmission may transmit the power generated by the engine to wheels for deceleration, and the TCU may control the transmission in response to a driver's transmission instruction through a transmission lever and/or a request of the traveling assistance apparatus 100.

The braking device 30 may stop the vehicle 1 and include, for example, a brake caliper and a brake control module (EBCM). The brake caliper may decelerate the vehicle 1 or stop the vehicle 1 using friction with a brake disc, and the EBCM may control the brake caliper in response to the driver's braking intention through a brake pedal and/or a request of the traveling assistance apparatus 100. For example, the EBCM may receive a deceleration request including a deceleration from the traveling assistance apparatus 100 and electrically or hydraulically control the brake caliper so that the vehicle 1 decelerates depending on the requested deceleration.

The steering device 40 may include an electronic power steering control module (EPS). The steering device 40 may change a traveling direction of the vehicle 1, and the EPS may assist an operation of the steering device 40 so that the driver may easily manipulate a steering wheel in response to the driver's steering intention through the steering wheel. In addition, the EPS may control the steering device in response to a request of the traveling assistance apparatus 100. For example, the EPS may receive a steering request including a steering torque from the traveling assistance apparatus 100 and control the steering device to steer the vehicle 1 depending on the requested steering torque.

In addition, the traveling assistance apparatus 100 may communicate with the driving device 20, the braking device 30, and the steering device 40 via the vehicle communication network.

The traveling assistance apparatus 100 may provide various functions for safety to the driver. For example, the traveling assistance apparatus 100 may provide lane departure warning (LDW), lane keeping assist (LKA), high beam assist (HBA), autonomous emergency braking (AEB), traffic sign recognition (TSR), adaptive cruise control (ACC), blind spot detection (BSD), and the like.

The traveling assistance apparatus 100 may include a camera 110, a radar 120, and a controller 140. The camera 110, the radar 120, and the controller 140 may not correspond to essential components of the traveling assistance apparatus 100. For example, at least one of the camera 110, the radar 120, or the controller 140 may be omitted from the traveling assistance apparatus 100, and a detector (e.g., light detection and ranging (LiDAR)) capable of detecting objects around the vehicle 1 may also be added to the traveling assistance apparatus 100.

The camera 110 may capture surroundings of the vehicle 1 and acquire image data of the surroundings of the vehicle 1. For example, as illustrated in FIG. 2, the camera 110 may be installed on a front windshield of the vehicle 1 and may have a forward field of view 110a of the vehicle 1.

The camera 110 may include a plurality of lenses and an image sensor 111. The image sensor 111 may include a plurality of photodiodes for converting light into electrical signals, and the plurality of photodiodes may be arranged in the form of a two-dimensional matrix. The image sensor 111 may output image data including images of the objects around the vehicle 1.

The camera 110 may include an image processor 112 for processing the image data. For example, the image processor 112 may process the image data to identify relative positions (distances from the vehicle and angles with respect to the traveling direction of the vehicle) and classification (e.g., whether the objects are other vehicles, pedestrians, cyclists, or the like) of the front objects of the vehicle 1. The image processor 112 may output first object data based on processing the image data. The first object data may include information on other vehicles, pedestrians, cyclists, or lane line markers (markers for distinguishing lanes) positioned around the vehicle 1.

The camera 110 may be electrically connected to the controller 140. For example, the camera 110 may be connected to the controller 140 via the vehicle communication network NT or connected to the controller 140 via a hard wire. The camera 110 may transmit the first object data around the vehicle 1 to the controller 140.

The radar 120 may transmit transmission radio waves to the outside of the vehicle 1 and detect external objects of the vehicle 1 based on reflected radio waves reflected from the external objects. For example, as illustrated in FIG. 2, the radar 120 may be installed on a grille or bumper of the vehicle 1 and may have a forward field of sensing 120a of the vehicle 1.

The radar 120 may include an antenna array 121 including a transmission antenna (or a transmission antenna array) for radiating transmission radio waves to the surroundings of the vehicle 1 and a reception antenna (or a reception antenna array) for receiving reflected radio waves reflected from objects. The radar 120 may acquire radar data from the transmission radio waves transmitted through the transmission antenna and the reflected radio waves received through the reception antenna.

The radar 120 may include a signal processor 122 for processing the radar data. The signal processor 122 may identify relative positions and relative velocities of the front objects based on the radar data. The signal processor 122 may output second object data based on processing the radar data. The second object data may include position information (e.g., distance information) and/or velocity information of the front objects of the vehicle 1.

The radar 120 may be connected to the controller 140 via, for example, the vehicle communication network NT or the hard wire and may transmit the radar data to the controller 140.

The controller 140 may be electrically connected to the camera 110 and/or the radar 120. In addition, the controller 140 may be connected to the driving device 20, the braking device 30, and the steering device 40 via the vehicle communication network NT.

The controller 140 may process the first object data of the camera 110 and/or the second object data of the radar 120 and provide control signals to the driving device 20, the braking device 30, and/or the steering device 40.

The controller 140 may include a memory 142 and a processor 141.

The memory 142 may store programs and/or data for processing the first object data and/or the second object data. In addition, the memory 142 may store programs and/or data for generating driving, braking, and steering signals.

The memory 142 may temporarily store the first object data received from the camera 110 and/or the second object data received from the radar 120 and temporarily store the results of processing the first object data and/or the second object data of the processor 141.

The memory 142 may include not only volatile memories such as a static random access memory (SRAM) and a dynamic RAM (DRAM) but also non-volatile memories such as a flash memory, a read only memory (ROM), and an erasable programmable ROM (EPROM).

The processor 141 may process the first object data of the camera 110 and/or the second object data of the radar 120. Based on processing the object data, the processor 141 may provide the driving signal, the braking signal, and/or the steering signal for controlling the driving device 20, the braking device 30, and/or the steering device 40, respectively. For example, the processor 141 may include a micro controller unit (MCU) for processing the first object data of the camera 110 and/or the second object data of the radar 120 and generating the driving, braking, and steering signals.

The processor 141 may fuse the first object data and/or the second object data and perform sensor fusion for detecting nearby objects of the vehicle 1. The processor 141 may output "object data" by performing the sensor fusion. For example, the processor 141 may match objects identified based on the second object data with objects identified based on the first object data and identify classification, relative positions, and relative velocities of the nearby objects of the vehicle 1 based on matching the objects.

The processor 141 may evaluate risk of a collision between the vehicle 1 and the nearby objects based on the relative positions and relative velocities of the nearby objects of the vehicle 1. For example, the processor 141 may calculate a time to collision (TTC) (or a distance to collision (DTC)) between the vehicle 1 and the nearby object based on the position (distance) and relative velocity of the nearby object of the vehicle 1 and evaluate the risk of collision between the vehicle 1 and the nearby object based on the TTC. The processor 141 may determine that the shorter the TTC, the higher the risk of collision.

The processor 141 may select a target object among the nearby objects of the vehicle 1 based on the risk of collision. For example, the processor 141 may select the target object based on the TTCs between the vehicle 1 and the nearby objects.

The processor 141 may generate the driving signal, the braking signal, or the steering signal based on risk of a collision with the target object. For example, the processor 141 may warn a driver of a collision or transmit the braking signal to the braking device 30 based on a comparison between a reference time and the TTCs between the vehicle 1 and the target objects. In addition, the processor 141 may transmit the steering signal to the steering device 40 in order to avoid the collision with the target object based on the comparison between a reference time and the TTCs between the vehicle 1 and the target objects.

Hereinafter, configurations and operations of the radar 120 and the signal processor 122 will be described in more detail.

Figure 3:
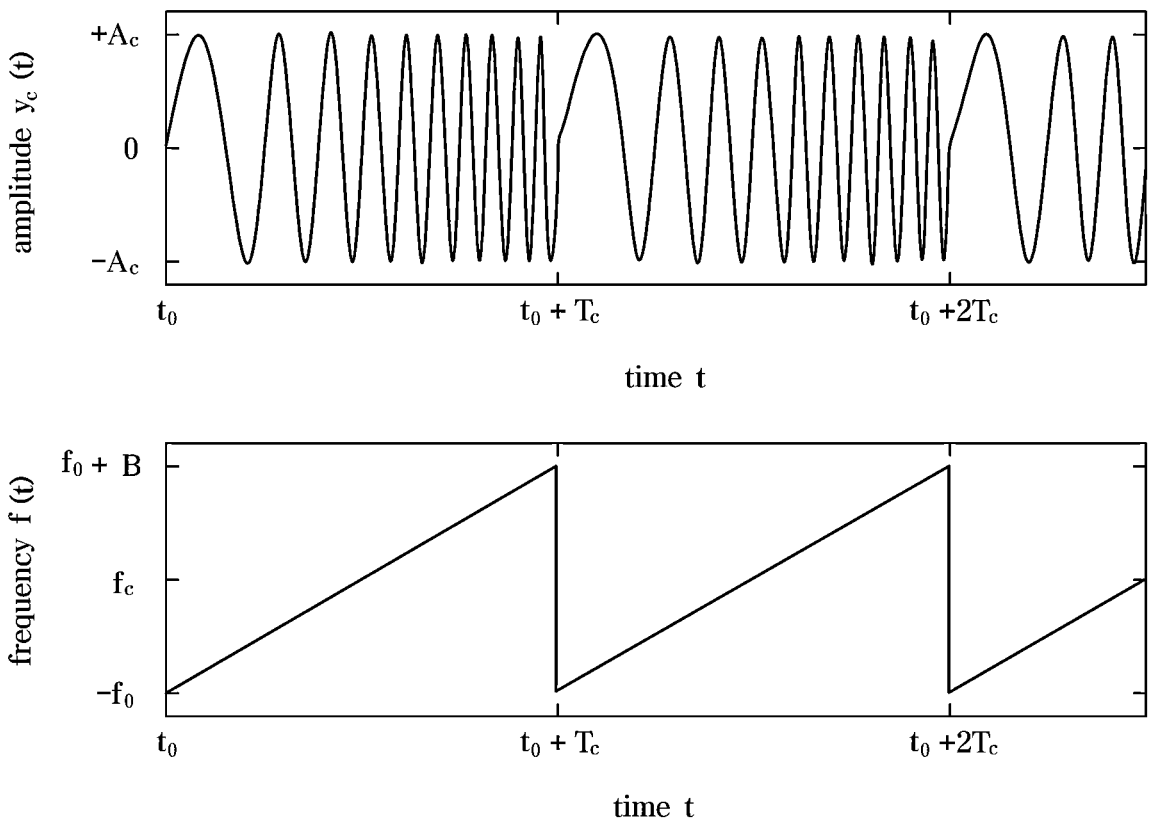
FIG. 3 is a view illustrating one example of radio waves transmitted by the traveling assistance apparatus according to one embodiment.

FIG. 3 is a view illustrating one example of radio waves transmitted by the traveling assistance apparatus according to one embodiment.

The radar 120 may include, for example, a frequency-modulated continuous-wave (FMCW) type radar for transmitting a series of linear chirps.

The FMCW type radar 120 may transmit the chirps through the antenna array 121. The chirp may include a sine wave or a sinusoidal wave whose frequency increases or decreases over time.

In particular, as illustrated in FIG. 3, the linear chirp may include a sine wave or a sinusoidal wave whose frequency linearly increases or decreases over time.

A frequency of the linear chirp illustrated in FIG. 3 may be expressed as [Equation 1].

[Equation 1]

$$f(t) = f_0 + \frac{B}{T_c}(t - t_0) = f_0 + S(t - t_0)$$

Here, $f_0$ denotes a start frequency at a time point $t_0$, B denotes a modulation width (i.e., bandwidth) of a frequency, and $T_c$ denotes a frequency modulation time of the chirp. S denotes a frequency change rate or a frequency slope.

In addition, since a derivative of a time with respect to a phase φ is an angular frequency, a function corresponding to a phase of a transmission signal may be an integral of a frequency function. Therefore, a change in the phase φ of the chirp may be expressed as [Equation 2].

$$\phi(t + \Delta t) \simeq \phi(t) + 2\pi f(t)\Delta t \qquad \text{[Equation 2]}$$

Here, φ denotes a phase of the linear chirp, and f(t) denotes a frequency of the linear chirp.

By using [Equation 2], the phase φ of the linear chirp may be expressed as [Equation 3].

$$\phi(t) = \phi_0 + 2\pi \int_{t_0}^{t} f(\tau)d\tau = \phi_0 + 2\pi\left[f_0(t - t_0) + \frac{B}{2T_c}(t^2 - t_0^2)\right] \qquad \text{[Equation 3]}$$

Here, φ denotes the phase of the linear chirp, and f(t) denotes the frequency of the linear chirp. $t_0$ denotes the start time, $f_0$ denotes a start frequency, and $\phi_0$ denotes an initial phase. In addition, B denotes a bandwidth of the linear chirp, and $T_c$ denotes a modulation time of the linear chirp.

By using [Equation 3], the phase φ with respect to the time may be expressed as [Equation 4].

$$y_c(t) = v_{TX}(t) = A_c \sin\left(\phi_0 + 2\pi f_0 t + \pi\frac{B}{T_c}(t - mT_c)^2\right) \qquad \text{[Equation 4]}$$

Here, $y_c$ denotes a linear chirp function, Ac denotes an amplitude of the linear chirp, and m denotes an $m^{th}$ chirp.

As illustrated in FIG. 3, the radar 120 may transmit the linear chirp expressed as [Equation 4].

A transmission chirp transmitted from the radar 120 may be mixed with a reception chirp reflected from an object. At this time, the reception chirp may be attenuated and delayed while being reflected from the object and propagated.

Due to such a time delay, a frequency of the reception chirp may be different from a frequency of the transmission chirp. Since the frequency of the transmission chirp linearly varies over time, the frequency of the reception chirp delayed during reflection may be different from the frequency of the transmission chirp. In addition, a difference between the frequency of the transmission chirp and the frequency of the reception chirp may be proportional to a distance between the vehicle 1 and a reflective object.

The signal processor 122 of the radar 120 may identify the distance between the vehicle 1 and the reflective object based on the difference between the frequency of the transmission chirp and the frequency of the reception chirp.

Figure 4:
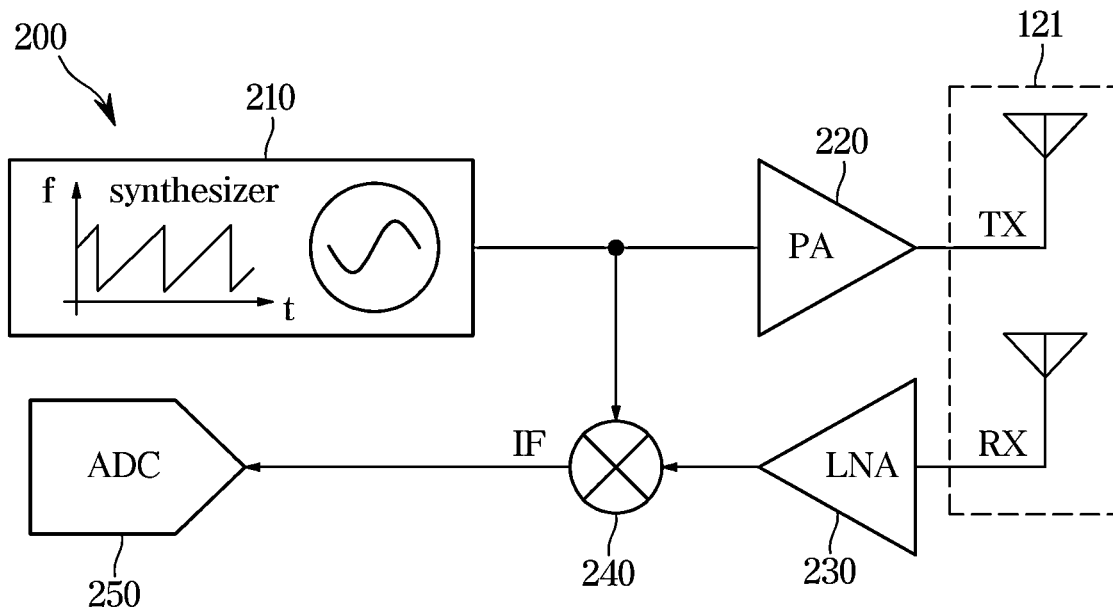
FIG. 4 is a view illustrating a signal processing circuit included in the traveling assistance apparatus according to one embodiment.

FIG. 4 is a view illustrating a signal processing circuit included in the traveling assistance apparatus according to one embodiment.

The radar 120 may further include a signal processing circuit 200 for processing an analog signal received through the antenna array 121.

The signal processing circuit 200 may acquire an intermediate frequency signal representing the difference between the frequency of the transmission chirp and the frequency of the reception chirp based on processing the analog signal. The signal processing circuit 200 may convert the acquired intermediate frequency signal into a digital signal and provide the digitalized intermediate frequency signal to the signal processor 122.

The signal processing circuit 200 may include a synthesizer 210, a power amplifier 220, a low noise amplifier 230, a frequency mixer 240, and/or an analog-to-digital converter (ADC) 250. The synthesizer 210, the power amplifier 220, the low noise amplifier 230, the frequency mixer 240, and the ADC 250 do not correspond to essential components of the signal processing circuit 200, and at least some thereof may be omitted.

The synthesizer 210 may generate a linear chirp signal in which a plurality of linear chirps are consecutive. The chirp signal generated by the synthesizer 210 can be expressed as the above-described [Equation 4].

The power amplifier 220 may amplify the chirp signal generated by the synthesizer 210.

The amplified chirp signal may be transmitted through the transmission antenna (or the transmission antenna array) of the antenna array 121. In addition, the reception antenna (or the reception antenna array) of the antenna array 121 may receive the chirp signal reflected from the object.

The low noise amplifier 230 may amplify the chirp signal received through the reception antenna.

The frequency mixer 240 may mix the chirp signal generated by the synthesizer 210 with the received chirp signal. The frequency mixer 240 may output the intermediate frequency signal by mixing the transmission chirp signal with the reception chirp signal. The intermediate frequency signal output from the frequency mixer 240 may include information on the object.

The ADC 250 may convert the intermediate frequency signal output from the frequency mixer 240 into a digital signal and provide the converted digital signal to the signal processor 122.

The signal processor 122 may receive the digital signal representing the intermediate frequency signal from the ADC 250 and process the received digital signal.

The signal processor 122 may identify a distance to the reflective object and a moving velocity of the reflective object based on processing the digital signal.

Figure 5A:
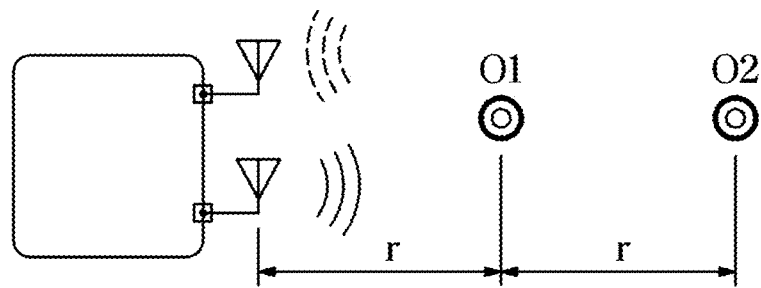
FIGS. 5A, 5B and 5C are a view illustrating one example of a transmission chirp signal and a reception chirp signal of the traveling assistance apparatus according to one embodiment.
Figure 5B:
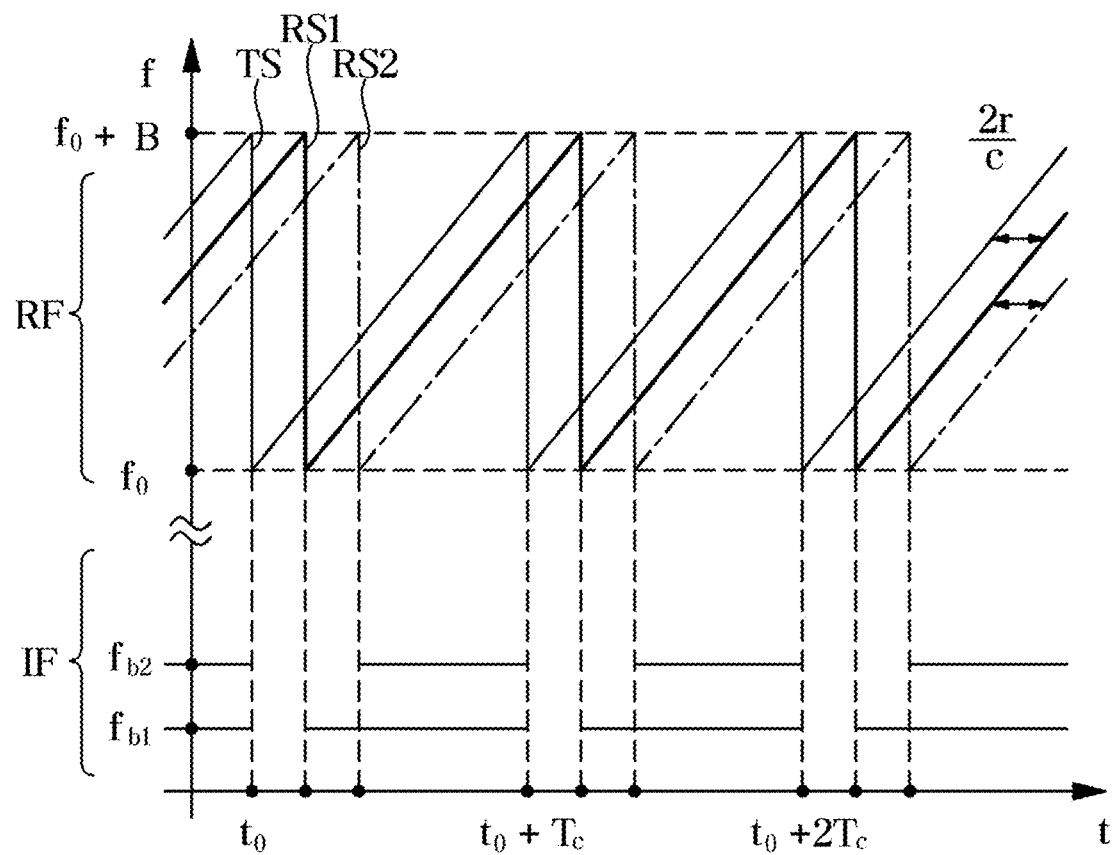
Figure 5C:
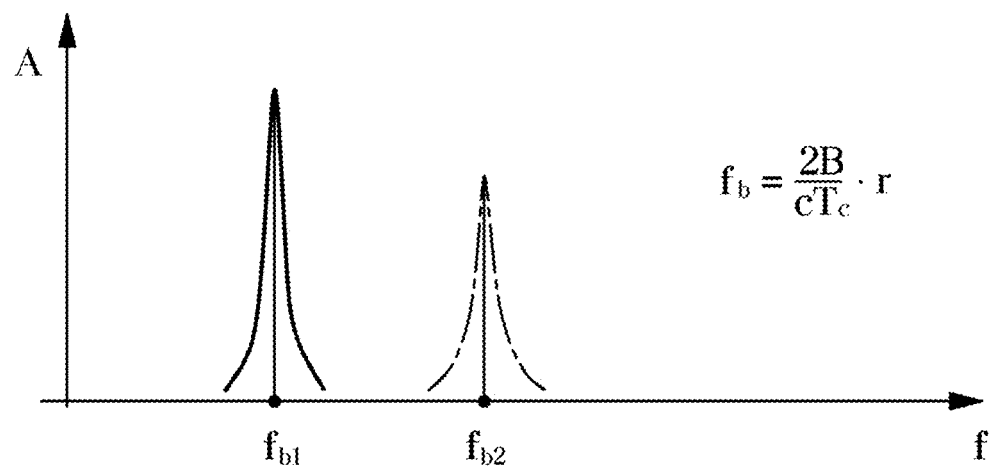

FIGS. 5A, 5B and 5C are a view illustrating one example of a transmission chirp signal and a reception chirp signal of the traveling assistance apparatus according to one embodiment.

Since a frequency of the signal (intermediate frequency signal) mixed by the frequency mixer 240 is a frequency corresponding to a difference between instantaneous frequencies and is the delayed signal of the transmission chirp signal generated by the frequency mixer 240 and the synthesizer 210, the intermediate frequency may include a frequency component proportional to the delay of the reception chirp signal.

For example, as illustrated in FIGS. 5A, 5B and 5C, a transmission chirp signal TS transmitted from the antenna array 121 may be reflected from a first object O1 and a second object O2. The antenna array 121 may receive a first reception chirp signal RS1 reflected from the first object O1 and a second reception chirp signal RS2 received by the second object O2.

A frequency of a mixed signal of the transmission chirp signal TS and the first reception chirp signal RS1 may be a first intermediate frequency $f_{b1}$, and a frequency of a mixed signal of the transmission chirp signal TS and the second reception chirp signal RS2 may be a second intermediate frequency $f_{b2}$.

The frequency of the mixed signal may correspond to a delay between the transmission chirp signal and the reception chirp signal. Specifically, the frequency of the mixed signal may be expressed as [Equation 5].

$$f_b = \frac{2rS}{c} = \frac{2B}{cT_c} \cdot r \quad \text{[Equation 5]}$$

Here, $f_b$ denotes a frequency of the mixed signal, r denotes a distance to the reflective object, c denotes a velocity of light, and S denotes a frequency slope of the transmission chirp signal. In addition, $T_c$ denotes a modulation time and B denotes a bandwidth of the transmission chirp signal.

The delay between the transmission chirp signal and the reception chirp signal may be equal to a round-trip delay time to the object. In addition, a difference between the frequency of the transmission chirp signal and the frequency of the reception chirp signal may correspond to the round-trip delay time.

The distance r to the object may be expressed as [Equation 6].

$$r = \frac{cf_b}{2S} = \frac{cT_c}{2B} \cdot f_b \quad \text{[Equation 6]}$$

Here, r denotes the distance to the reflective object, c denotes the velocity of light, and S denotes the frequency slope of the transmission chirp signal. $T_c$ denotes the modulation time, B denotes the bandwidth of the transmission chirp signal, and $f_b$ denotes the intermediate frequency of the signal mixed by the frequency mixer 240.

In addition, initial phases of all components of the intermediate frequency signal may be a difference between a phase of the transmission chirp signal and a phase of the reception chirp signal at the start of the intermediate frequency signal.

The radar 120 may consecutively transmit a plurality of chirp signals at equal intervals in order to identify a moving velocity of a moving object.

While the object is moving, a distance measurement through the round-trip delay of the chirp signal is affected by compression or elongation of a signal known as the Doppler effect.

Spatial displacement of the object may occur due to the movement of the object while the plurality of chirp signals are consecutively transmitted.

The spatial displacement of the object may affect both the frequency and phase of the intermediate frequency signal by the plurality of chirp signals. The spatial displacement of the object may lead to a change in the round-trip delay of the chirp signal. The spatial displacement of the object does not affect the initial phase of the transmission chirp signal but affects a current phase of the reception chirp signal, and thus may affect the phase of the intermediate frequency signal.

A phase difference of the intermediate frequency signal may be expressed as [Equation 7].

$$\Delta\phi = 2\pi f_0 \Delta t = 2\pi f_0 \frac{2\Delta d}{c} = \frac{4\pi}{\lambda_0} \cdot \Delta d \quad \text{[Equation 7]}$$

Here, $\Delta\varphi$ denotes a phase difference of the intermediate frequency signal, $f_0$ denotes a start frequency of the chirp signal, $\lambda_0$ denotes a wavelength of the chirp signal, $\Delta t$ denotes a change in the round-trip delay of the chirp signal, and $\Delta d$ denotes a change in the round-trip distance, that is, the spatial displacement of the object.

When the object moves $\Delta d$ for the modulation time $T_c$, the velocity of the moving object may be expressed as [Equation 8].

[Equation 8]

$$v = \frac{\lambda_0}{4\pi T_c} \cdot \Delta\phi$$

Here, v denotes a velocity of the moving object, $\lambda_0$ denotes the wavelength of the chirp signal, $T_c$ denotes the modulation time, and $\Delta\varphi$ denotes the phase difference of the intermediate frequency signal.

Figure 6:
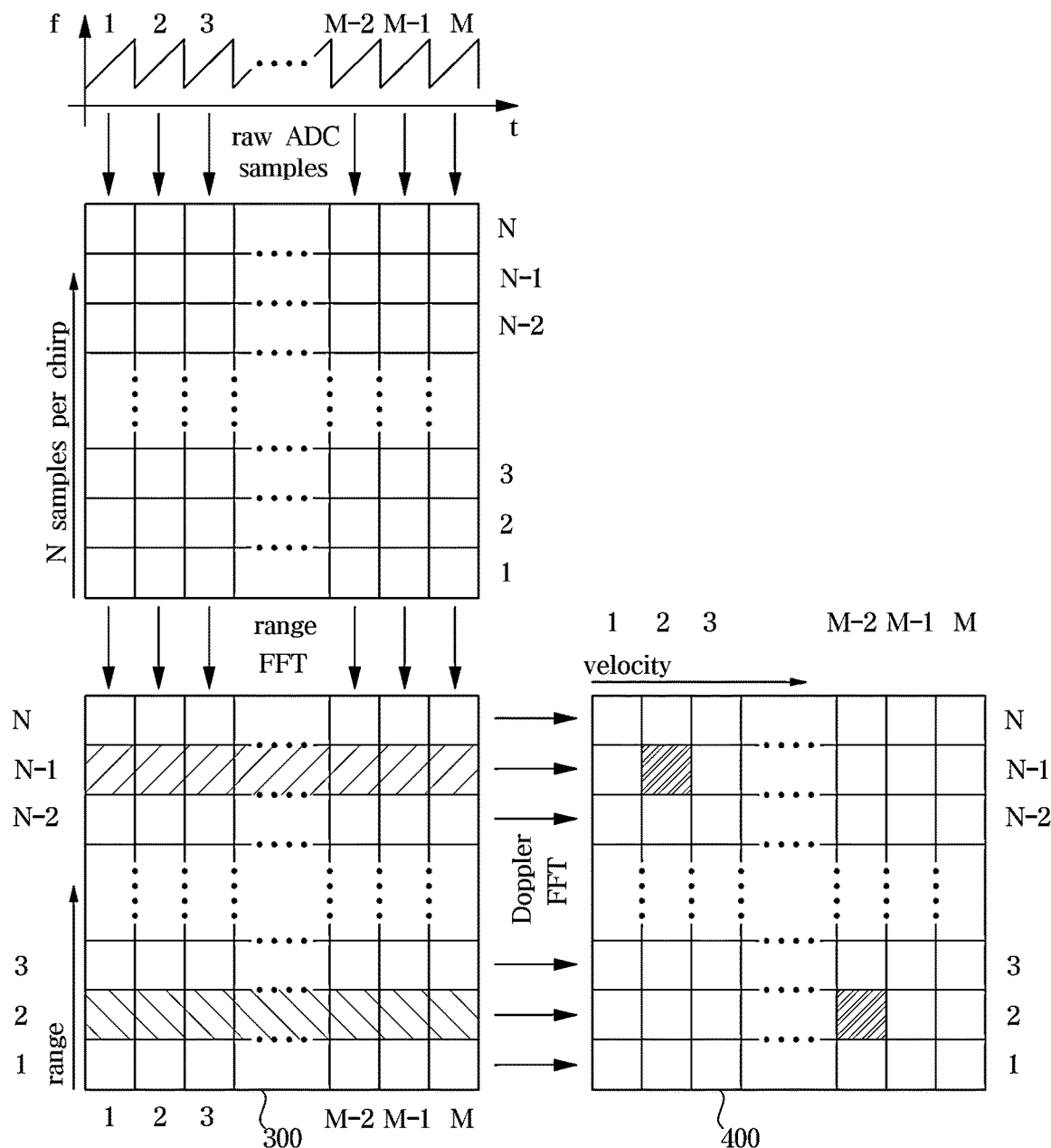
FIG. 6 is a view illustrating one example in which an intermediate frequency signal of the traveling assistance apparatus according to one embodiment is processed.

FIG. 6 is a view illustrating one example for processing an intermediate frequency signal of the traveling assistance apparatus according to one embodiment.

The signal processor 122 may process the digitized intermediate frequency signal using Fast Fourier Transform (FFT). The signal processor 122 may identify the intermediate frequency $f_b$ of the intermediate frequency signal and the phase difference $\Delta\varphi$ of the intermediate frequency signal using the FFT. In addition, the signal processor 122 may identify the distance to the object based on the intermediate frequency $f_b$ of the intermediate frequency signal and the moving velocity of the object based on the phase difference $\Delta\varphi$ of the intermediate frequency signal.

The radar 120 may transmit the chirp signal including the plurality of chirps in order to identify the distance to the object and the moving velocity of the object. For example, as illustrated in FIG. 6, the radar 120 may transmit a signal including M chirps.

The ADC 250 may sample the intermediate frequency signal N times while each chirp is transmitted and convert the sampled analog signal into a digital signal.

The signal processor 122 may transform the intermediate frequency signal digitized by the ADC 250 into a frequency domain signal through the FFT. Specifically, the signal processor 122 may transform an intermediate frequency signal corresponding to one chirp into a frequency domain signal through the FFT.

For example, as illustrated in FIG. 6, the signal processor 122 may transform an intermediate frequency signal corresponding to each of the M chirps into a frequency domain signal through the FFT. When acquiring N pieces of sampling data of the intermediate frequency signal corresponding to one chirp, the signal processor 122 may transform the acquired sampling data into the frequency domain signal through the FFT. Therefore, the signal processor 122 may store only the N pieces of sampling data and a minimized memory can be used for storing the sampling data.

Hereinafter, the transforming of the intermediate frequency signal corresponding to each of the M chirps into the frequency domain signal through the FFT is referred to as a "range FFT."

The signal processor 122 may acquire a frequency domain matrix 300 having peaks at intermediate frequencies $f_{b1}$ and $f_{b2}$ corresponding to the distance to the reflective object as illustrated in FIGS. 5A, 5B and 5C by performing the range FFT on the intermediate frequency signal corresponding to each of the M chirps. As described above, due to the frequency difference between the transmission chirp signal and the reception chirp signal caused by the delay of the reception chirp signal, the intermediate frequency signal having the peaks at the intermediate frequencies $f_{b1}$ and $f_{b2}$ may be acquired, and the frequency domain matrix 300 having the peaks at the intermediate frequencies $f_{b1}$ and $f_{b2}$ may be acquired.

Then, as illustrated in FIG. 6, the signal processor 122 may transform data of the frequency domain matrix 300, which has been acquired after performing the range FFT, through the FFT. Specifically, the signal processor 122 may transform a series of data, which correspond to the same frequency in the frequency domain matrix 300, through the FFT.

Hereinafter, the transforming of the series of data corresponding to the same frequency through the FFT is referred to as a "Doppler FFT."

The signal processor 122 may acquire a phase domain matrix 400 having a peak at the phase difference $\Delta\varphi$ corresponding to the moving velocity of the reflective object as illustrated in FIG. 6 by performing the Doppler FFT. As described above, the phase difference $\Delta\varphi$ may occur between the M reception chirp signals due to the movement of the object, and the phase domain matrix 400 having the peak at each frequency corresponding to the phase difference $\Delta\varphi$ may be acquired by the Doppler FFT performed on the frequency domain matrix 300.

The signal processor 122 may acquire the frequency domain matrix 300 by performing the range FFT on the intermediate frequency signal generated by the frequency mixing of the transmission chirp signal and the reception chirp signal. In addition, the signal processor 122 may acquire the phase domain matrix 400 by performing the Doppler FFT on the frequency domain matrix 300.

As described above, the range FFT may be performed on the sampling data sampled at the same chirp, and the Doppler FFT may be performed on the series of data corresponding to the same frequency. For example, as illustrated in FIG. 6, the range FFT may be performed on data in the same column, and the Doppler FFT may be performed on data in the same row.

Hereinafter, the performing of the range FFT on the data in the same column and the performing of the Doppler FFT on the data in the same row are collectively referred to as a "2-dimension FFT."

The signal processor 122 may sample the N intermediate frequency signals and store the sampled signals to perform the range FFT. At this time, since the range FFT is performed on N sampling data corresponding to one chirp, a memory capable of storing the N pieces of sampling data may be used.

In addition, since the Doppler FFT is performed on the series of data corresponding to the same frequency of the frequency domain matrix 300 acquired as performing the range FFT, N pieces of frequency data are required for all M chirps to perform the Doppler FFT. Therefore, a memory capable of storing M×N frequency data may be used to perform the Doppler FFT.

Figure 7A:
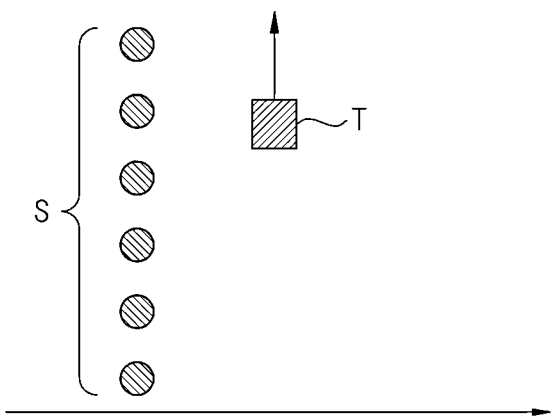
FIGS. 7A, 7B and 7C are a view for describing Doppler ambiguity in the related art.
Figure 7B:
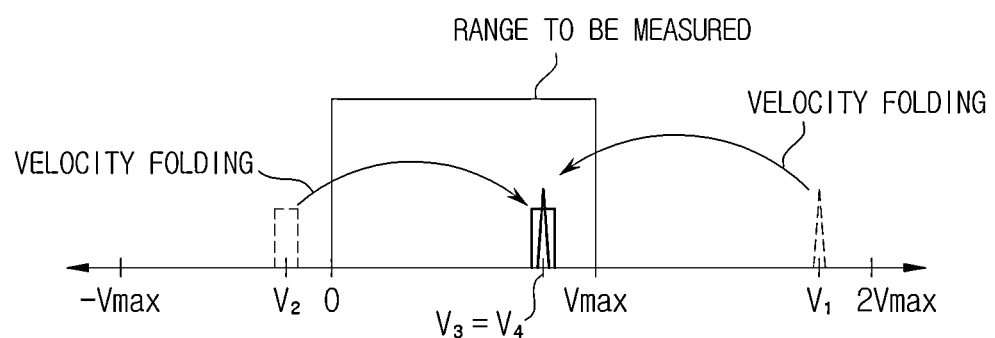
Figure 7C:
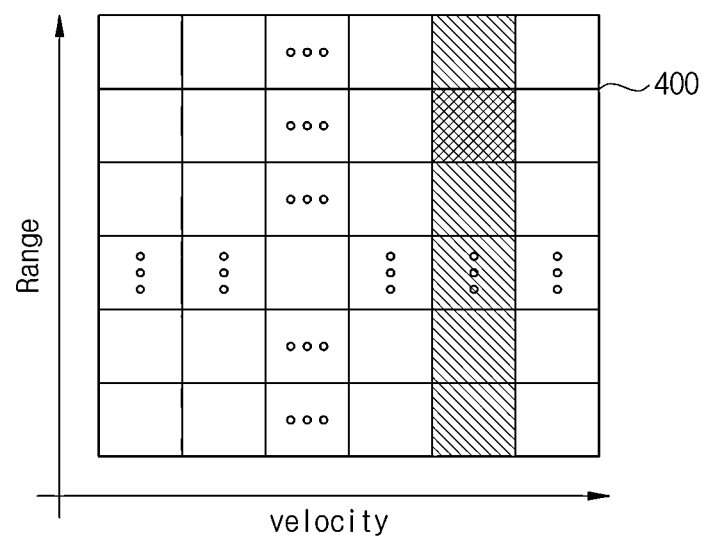
Figure 8:
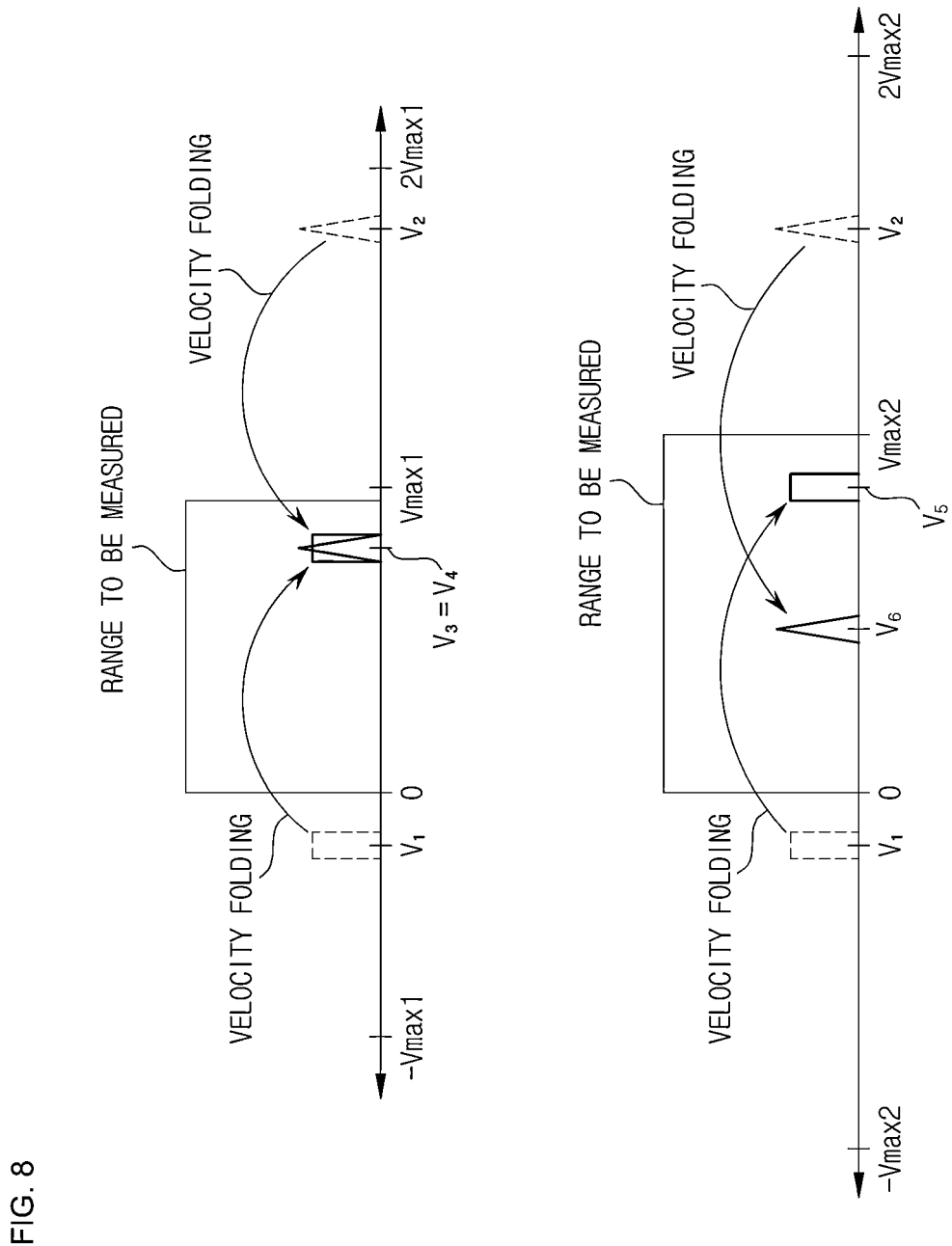
FIG. 8 is a view for describing solutions of the Doppler ambiguity in the related art.

FIGS. 7A, 7B and 7C are a view for describing Doppler ambiguity in the related art. FIG. 8 is a view for describing solutions of the Doppler ambiguity in the related art.

Referring to FIGS. 7 and 8, a target object T and a stationary structure S may be positioned around the vehicle 1.

The target object T may be a movable object and may include objects capable of interfering with the traveling of the vehicle 1, such as another vehicle, a pedestrian, a cyclist, and an animal. For example, the target object T may be another vehicle that travels on the same lane as the vehicle 1 or travels on a lane adjacent to the lane on which the vehicle 1 travels. Therefore, the target object T may have potential risk of collision with the vehicle 1.

The target object T may move around the vehicle 1 as illustrated in FIG. 7A. A relative velocity of the target object T, which is faster than the vehicle 1, to the vehicle 1 may have a positive value.

The stationary structure S may be an object incapable of moving without an external force and may be various structures around a road. Examples of the stationary structure S may include a median, a guardrail, a street tree, etc.

As illustrated in FIG. 7A, the stationary structures S may be periodically disposed at predetermined intervals along a road or a lane on which the vehicle 1 travels. A relative velocity of the stationary structure S to the vehicle 1 may have a negative value. In addition, a relative velocity of each of the periodically disposed stationary structures S to the vehicle 1 may be substantially the same.

Due to Doppler ambiguity, velocity folding may occur. In addition, due to the velocity folding, the relative velocity of the target object T and the relative velocity of the stationary structure S may overlap.

A maximum value of an identifiable Doppler frequency may be limited by a pulse repetition frequency (PRF) of a chirp signal or a pulse repetition interval (PRI) of the chirp signal. Therefore, an identifiable maximum velocity of an object may be limited.

When the velocity of the object is higher than or equal to the identifiable maximum velocity, the velocity folding may occur. For example, as illustrated in FIG. 7B, when a relative velocity $V_1$ of the target object T is higher than or equal to a maximum velocity Vmax, a velocity $V_3$ obtained by subtracting the maximum velocity Vmax from the relative velocity $V_1$ of the target object T due to the velocity folding may be measured.

In addition, when the velocity of the object is a negative value, the velocity folding may also occur. For example, as illustrated in FIG. 7B, when a relative velocity $V_2$ of the stationary structure S is a negative value, a velocity $V_4$ obtained by adding the maximum velocity Vmax and the relative velocity $V_2$ being the negative value of the stationary structure S due to the velocity folding may be measured.

Therefore, due to the Doppler ambiguity, the velocity of the object may be observed differently from an actual velocity.

In particular, under specific conditions, the velocity $V_3$ obtained by subtracting the maximum velocity Vmax from the relative velocity $V_1$ of the target object T may be equal to the velocity $V_4$ obtained by adding the maximum velocity Vmax and the relative velocity $V_2$ being the negative value of the stationary structure S.

In addition, since the stationary structures S are repeatedly positioned at predetermined intervals, the stationary structures S may be detected in an approximately straight line along a range axis in a phase domain matrix 400. For example, when the velocity $V_3$ obtained by subtracting the maximum velocity Vmax from the relative velocity $V_1$ of the target object T is equal to the velocity $V_4$ obtained by adding the maximum velocity Vmax and the relative velocity $V_2$ being the negative value of the stationary structure S, the relative velocity of the target object T and the relative velocity of the stationary structure S may overlap in the phase domain matrix 400, as illustrated in FIG. 7C.

Therefore, the relative velocity $V_1$ of the target object T may not be distinguished from the relative velocity $V_2$ of the stationary structure S, and the relative velocity $V_1$ of the target object T may not be detected. An error in detecting an angle of the target object T as well as an error in detecting the relative velocity of the target object T may occur.

In order to solve this Doppler ambiguity, sets of chirp signals having different PRFs or different PRIs may be used. For example, a first set of chirp signals having a first PRI and a second set of chirp signals having a second PRI may be used.

As illustrated in FIGS. 8A and 8B, the radar 120 may identify up to a first maximum velocity Vmax1 of the object using the first set of chirp signals having the first PRI and also identify up to a second maximum velocity Vmax2 of the object using the second set of chirp signals having the second PRI.

In the case of using the first set of chirp signals having the first PRI, the target object T may be observed as having a third velocity $V_3$ obtained by subtracting the first maximum velocity Vmax1 from the relative velocity $V_1$ of the target object T due to the velocity folding. In addition, the stationary structure S may be observed as having a fourth velocity $V_4$ obtained by adding the second maximum velocity Vmax2 and the relative velocity $V_2$ being the negative value of the stationary structure S due to the velocity folding.

As illustrated in FIG. 8A, the third velocity $V_3$ obtained by subtracting the first maximum velocity Vmax1 from the relative velocity $V_1$ of the target object T may be equal to the fourth velocity $V_4$ obtained by adding the first maximum velocity Vmax1 and the relative velocity $V_2$ being the negative value of the stationary structure S.

Therefore, the relative velocity of the target object T may not be distinguished from the relative velocity of the stationary structure S.

In addition, in the case of using the second set of chirp signals having the second PRI, the target object T may be observed as having a fifth velocity $V_5$ obtained by subtracting the second maximum velocity Vmax2 from the relative velocity $V_1$ of the target object T due to the velocity folding. In addition, the stationary structure S may be observed as having a sixth velocity $V_6$ obtained by adding the second maximum velocity Vmax2 and the relative velocity $V_2$ being the negative value of the stationary structure S due to the velocity folding.

When the third velocity $V_3$ is equal to the fourth velocity $V_4$, the fifth velocity $V_5$ obtained by subtracting the second maximum velocity Vmax2 from the relative velocity $V_1$ of the target object T may be different from the sixth velocity $V_6$ obtained by adding the second maximum velocity Vmax2 and the relative velocity $V_2$ being the negative value of the stationary structure S.

Therefore, the relative velocity of the target object T may be distinguished from the relative velocity of the stationary structure S.

Figure 9:
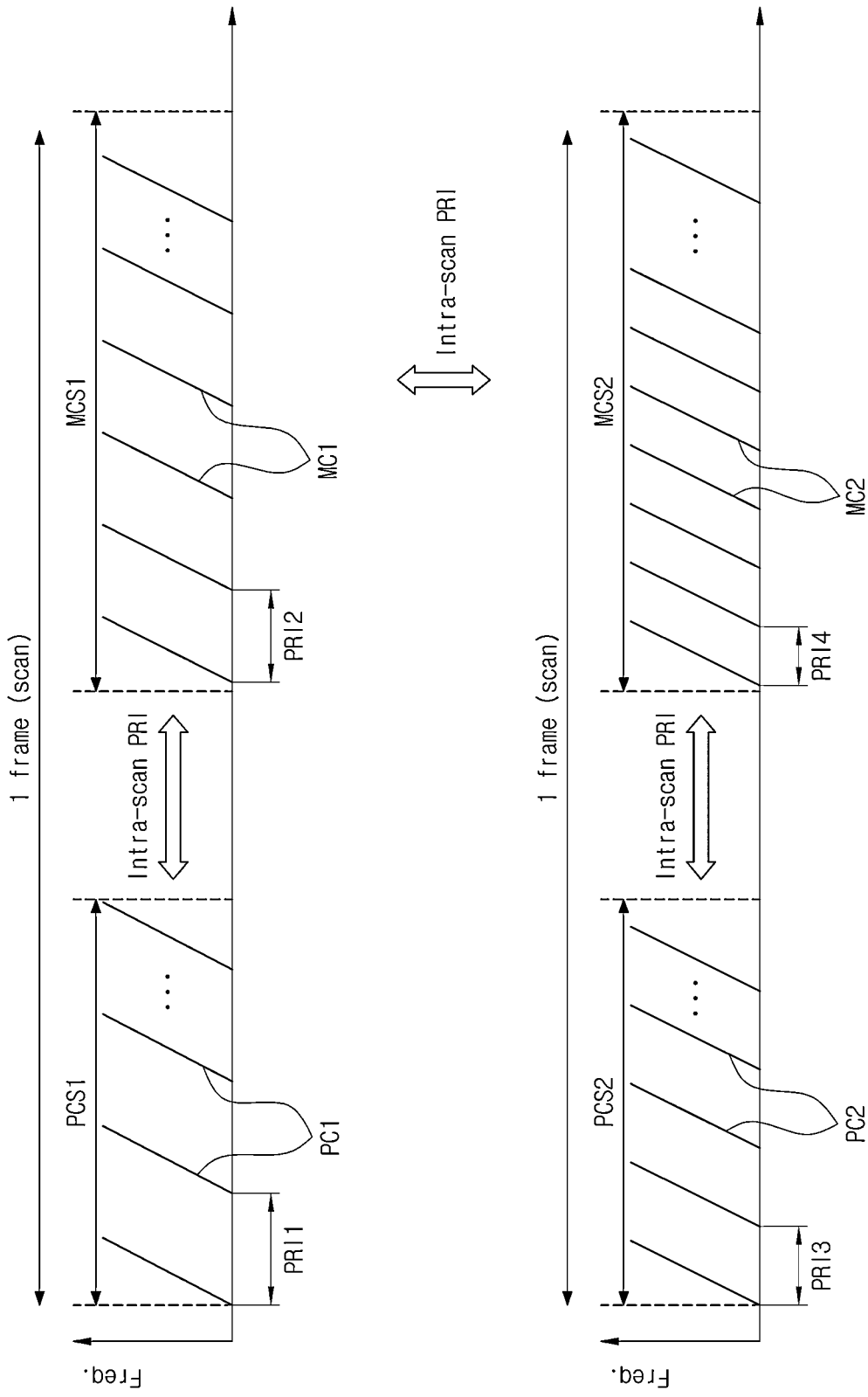
FIG. 9 is a view illustrating one example of the transmission chirp signal of the traveling assistance apparatus according to one embodiment.
Figure 10:
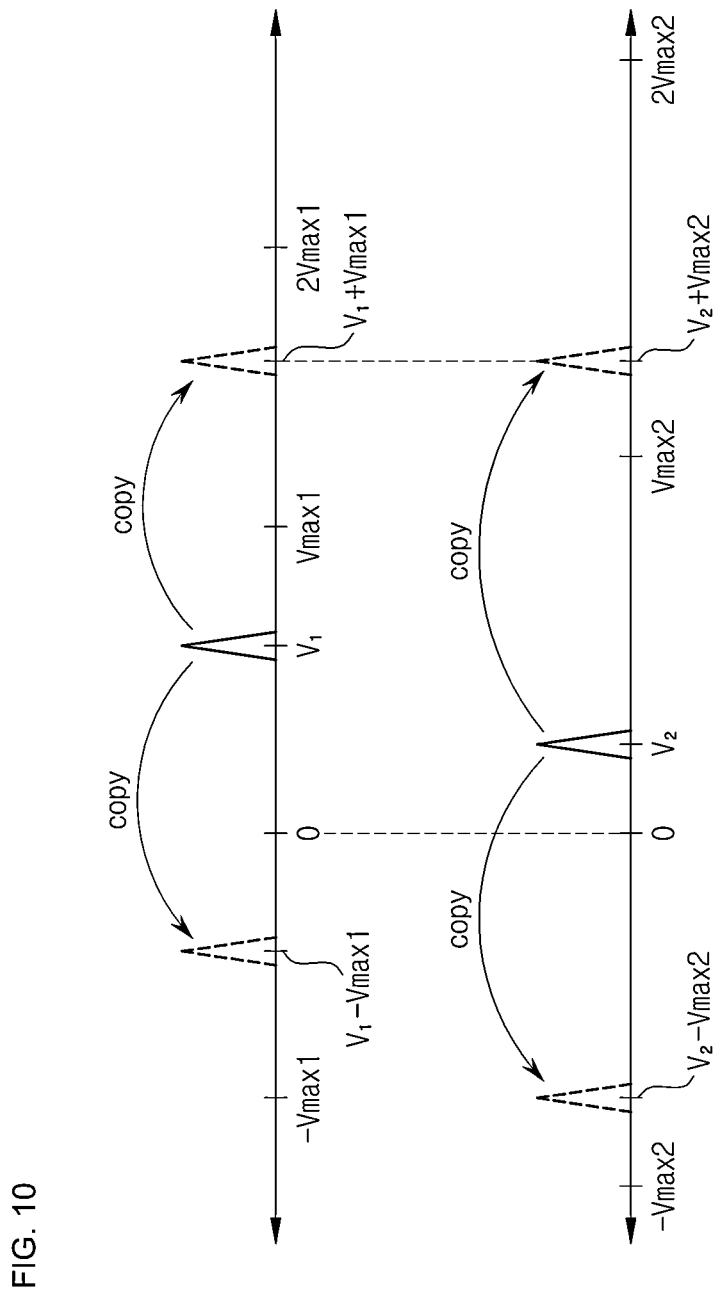
FIG. 10 is a view for describing solutions of Doppler ambiguity by the traveling assistance apparatus according to one embodiment.

FIG. 9 is a view illustrating one example of the transmission chirp signal of the traveling assistance apparatus according to one embodiment. FIG. 10 is a view for describing solutions of Doppler ambiguity by the traveling assistance apparatus according to one embodiment.

As illustrated in FIG. 9, the radar 120 may transmit a first pre-chirp signal PCS1 and a first main chirp signal MCS1. For example, the signal processing circuit 200 may provide the first pre-chirp signal PCS1 and the first main chirp signal MCS1 to the antenna array 121, and the antenna array 121 may transmit radio waves corresponding to the first pre-chirp signal PCS1 and radio waves corresponding to the first main chirp signal MCS1. The first pre-chirp signal PCS1 and the first main chirp signal MCS1 may integrally form one frame. Hereinafter, the radio waves corresponding to the first pre-chirp signal PCS1 and the radio waves corresponding to the first main chirp signal MCS1 are respectively referred to as "first pre-chirp signal PCS1" and "first main chirp signal MCS1."

The first pre-chirp signal PCS1 may include Mp1 consecutive first pre-chirps PC1, and the first main chirp signal MCS1 may include Mm1 consecutive first main chirps MC1. In this case, the number of first pre-chirps PC1 included in the first pre-chirp signal PCS1 may be smaller than the number of first main chirps MC1 included in the first main chirp signal MCS1. In addition, an interval (hereinafter referred to as "first PRI") between the first pre-chirps PC1 included in the first pre-chirp signal PCS1 may be greater than an interval (hereinafter referred to as "second PRI") between the first main chirps MC1 included in the first main chirp signal MCS1.

The radar 120 may transmit the first pre-chirp signal PCS1 before transmitting the first main chirp signal MCS1.

While the first pre-chirp signal PCS1 is transmitted, the signal processor 122 may acquire N pieces of sampling data on an intermediate frequency signal corresponding to each of the Mp1 first pre-chirps PC1. The signal processor 122 may perform the two-dimensional FFT on the N pieces of sampling data on the intermediate frequency signal corresponding to each of the first pre-chirps PC1. The signal processor 122 may acquire an Mp1×N phase domain matrix by the two-dimensional FFT.

The signal processor 122 may identify a bin in which object data is not present in the Mp1×N phase domain matrix. Here, the bin may represent a series of data representing the same interval in a frequency domain matrix and the phase domain matrix.

The signal processor 122 may generate a bin mask for removing a bin not including the object data.

In addition, the radar 120 may transmit the first main chirp signal MCS1 after transmitting the first pre-chirp signal PCS1.

While the first main chirp signal MCS1 is transmitted, the signal processor 122 may acquire N pieces of sampling data on an intermediate frequency signal corresponding to each of the Mm1 first main chirps MC1.

The signal processor 122 may acquire the N pieces of sampling data on the intermediate frequency signal corresponding to the first main chirps MC1. The signal processor 122 may ignore, remove, omit, or filter data on the bin not including the object data from Mm1×N pieces of sampling data using the bin mask and store only data on a bin including the object data. In addition, the signal processor 122 may perform the two-dimensional FFT on the data of the bin including the object data. The signal processor 122 may acquire a phase domain matrix only including the data related to the object by the two-dimensional FFT.

Therefore, the signal processor 122 can reduce a capacity of a memory for storing the frequency domain matrix. In addition, the radar 120 can solve the Doppler ambiguity using the first pre-chirp signal PCS1 and the first main chirp signal MCS1.

For example, the signal processor 122 may acquire the first velocity $V_1$ of the target by performing the two-dimensional FFT on the intermediate frequency signal corresponding to the first pre-chirp signal PCS1. In addition, the signal processor 122 may acquire the second velocity $V_2$ of the target by performing the two-dimensional FFT on the intermediate frequency signal corresponding to the first main chirp signal MCS1.

As illustrated in FIG. 10, the first velocity $V_1$ of the target may be different from the second velocity $V_2$ of the target.

When the first velocity $V_1$ is different from the second velocity $V_2$, as illustrated in FIG. 10, the signal processor 122 may compare a difference ($V_1$−Vmax1) between the first velocity $V_1$ and the first maximum velocity Vmax1 with a difference ($V_2$−Vmax2) between the second velocity $V_2$ and the second maximum velocity Vmax2. Here, the first maximum speed Vmax1 may represent the maximum speed that may be measured using the first pre-chirp signal PCS1, and the second maximum speed Vmax2 may represent the maximum velocity that may be measured using the first main chirp signal MCS1.

When the difference ($V_1$−Vmax1) between the first velocity $V_1$ and the first maximum velocity Vmax1 is different from the difference ($V_2$−Vmax2) between the second velocity $V_2$ and the second maximum velocity Vmax2, as illustrated in FIG. 10, the signal processor 122 may compare the sum ($V_1$+Vmax1) of the first velocity $V_1$ and the first maximum velocity Vmax1 with the sum ($V_2$+Vmax2) of the second velocity $V_2$ and the second maximum velocity Vmax2.

When the sum ($V_1$+Vmax1) of the first velocity $V_1$ and the first maximum velocity Vmax1 is equal to the sum ($V_2$+Vmax2) of the second velocity $V_2$ and the second maximum velocity Vmax2 or a difference therebetween is within an allowable error range, the signal processor 122 may determine that the velocity of the target is the sum ($V_1$+Vmax1) of the first velocity $V_1$ and the first maximum velocity Vmax1 or the sum ($V_2$+Vmax2) of the second velocity $V_2$ and the second maximum velocity Vmax2.

The radar 120 may transmit a second pre-chirp signal PCS2 and a second main chirp signal MCS2 as an alternative to the first pre-chirp signal PCS1 and the first main chirp signal MCS1. For example, the signal processing circuit 200 may provide the second pre-chirp signal PCS2 and the second main chirp signal MCS2 to the antenna array 121, and the antenna array 121 may transmit radio waves corresponding to the second pre-chirp signal PCS2 and radio waves corresponding to the second main chirp signal MCS2. The second pre-chirp signal PCS2 and the second main chirp signal MCS2 may integrally form one frame. Hereinafter, the radio waves corresponding to the second pre-chirp signal PCS2 and the radio waves corresponding to the second main chirp signal MCS2 are respectively referred to as "second pre-chirp signal PCS2" and "second main chirp signal MCS2."

The second pre-chirp signal PCS2 may include Mp2 consecutive second pre-chirps PC2, and the second main chirp signal MCS2 may include Mm2 consecutive second main chirps MC2. In this case, the number of second pre-chirps PC2 included in the second pre-chirp signal PCS2 may be smaller than the number of second main chirps MC2 included in the second main chirp signal MCS2. In addition, an interval (hereinafter referred to as "third PRI") between the second pre-chirps PC2 included in the second pre-chirp signal PCS2 may be greater than an interval (hereinafter referred to as "fourth PRI") between the second main chirps MC2 included in the second main chirp signal MCS2.

Here, the third PRI of the second pre-chirps PC2 may be different from the first PRI of the first pre-chirps PC1. In addition, the fourth PRI of the second main chirp signal MCS2 may be different from the second PRI of the first main chirp signal MCS1.

The radar 120 may transmit the second pre-chirp signal PCS2 before transmitting the second main chirp signal MCS2.

While the second pre-chirp signal PCS2 is transmitted, the signal processor 122 may acquire N pieces of sampling data on an intermediate frequency signal corresponding to each of the Mp2 second pre-chirps PC2. The signal processor 122 may perform the two-dimensional FFT on the N pieces of sampling data on the intermediate frequency signal corresponding to each of the second pre-chirps PC2. The signal processor 122 may acquire an Mp2×N phase domain matrix by the two-dimensional FFT.

The signal processor 122 may identify a bin in which object data is not present in the Mp2×N phase domain matrix. The signal processor 122 may generate a bin mask for removing a bin not including the object data.

In addition, the radar 120 may transmit the second main chirp signal MCS2 after transmitting the second pre-chirp signal PCS2.

While the second main chirp signal MCS2 is transmitted, the signal processor 122 may acquire N pieces of sampling data on an intermediate frequency signal corresponding to each of the Mm2 second main chirps MC2.

The signal processor 122 may acquire the N pieces of sampling data on the intermediate frequency signal corresponding to the second main chirps MC2. The signal processor 122 may ignore, remove, omit, or filter data on the bin not including the object data from Mm2×N pieces of sampling data using the bin mask and store only data on a bin including the object data. In addition, the signal processor 122 may perform the two-dimensional FFT on the data on the bin including the object data. The signal processor 122 may acquire a phase domain matrix only including the data related to the object by the two-dimensional FFT.

Therefore, the signal processor 122 can reduce a capacity of a memory for storing the frequency domain matrix. In addition, the radar 120 can solve the Doppler ambiguity using the second pre-chirp signal PCS2 and the second main chirp signal MCS2.

As described above, the radar 120 may transmit a frame including the first pre-chirp signal PCS1 and the first main chirp signal MCS1 or transmit a frame including the second pre-chirp signal PCS2 and the second main chirp signal MCS2. Here, the first PRI between the first pre-chirps PC1 may be different from the second PRI between the first main chirps MC1 and may also be different from the third PRI between the second pre-chirps PC2. The second PRI between the first main chirps MC1 may be different from the fourth PRI between the second main chirps MC2. In addition, the third PRI between the second pre-chirps PC2 may be different from the fourth PRI between the second main chirps MC2.

The radar 120 can resolve the Doppler ambiguity using the second pre-chirp signal PCS2 and the second main chirp signal MCS2 by the same method as the method of resolving the Doppler ambiguity using the first pre-chirp signal PCS1 and the first main chirp signal MCS1.

Figure 11A:
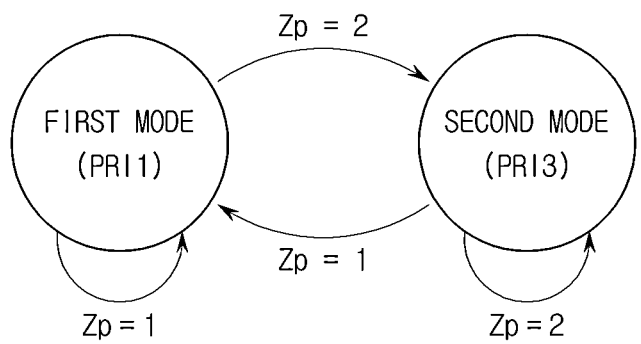
FIGS. 11A, 11B and 11C are a view illustrating one example in which a state of the traveling assistance apparatus according to one embodiment is changed.
Figure 11B:
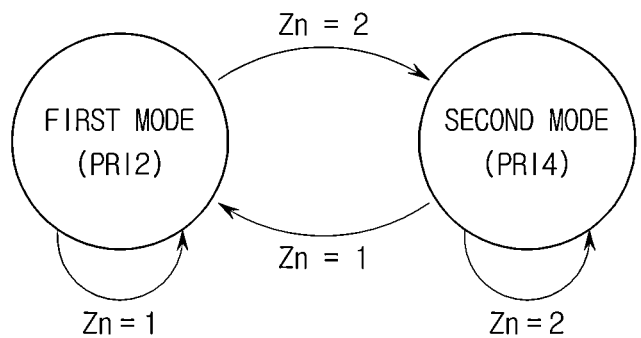
Figure 11C:
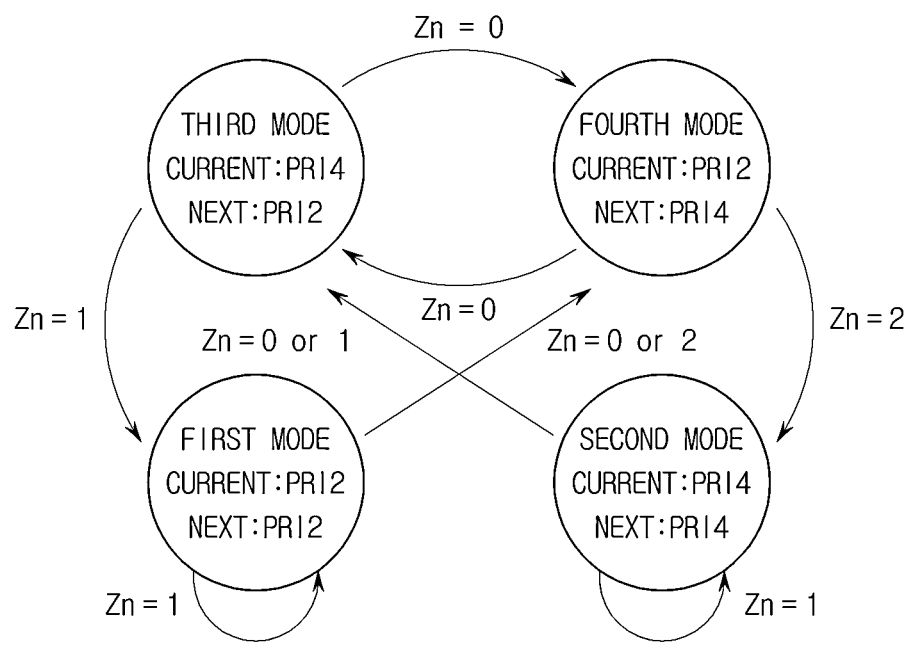

FIGS. 11A, 11B and 11C are a view illustrating one example in which a state of the traveling assistance apparatus according to one embodiment is changed.

The radar 120 may transmit the first pre-chirp signal PCS1 and the first main chirp signal MCS1 or transmit the second pre-chirp signal PCS2 and the second main chirp signal MCS2 according to an internal state.

For example, as illustrated in FIG. 11A, the radar 120 may become a "first mode" or a "second mode" according to a phase domain matrix by a pre-chirp signal. The first mode and the second mode are mutually exclusive, and the first mode and the second mode may not be satisfied simultaneously.

The radar 120 may transmit the first pre-chirp signal PCS1 and the first main chirp signal MCS1 in the first mode and also transmit the second pre-chirp signal PCS2 and the second main chirp signal MCS2 in the second mode.

The first mode and the second mode may be determined by a first index Zp. For example, as illustrated in FIG. 11A, when the first index Zp is "1," the radar 120 may maintain the first mode or may be switched from the second mode to the first mode. In addition, when the first index Zp is "2," the radar 120 may maintain the second mode or may be switched from the first mode to the second mode.

The first index Zp may be determined according to whether distances and velocities of different objects in the phase domain matrix by the pre-chirp signal overlap each other. For example, when the distances and velocities of different objects in the phase domain matrix by the first pre-chirp signal PCS1 are within a predetermined error range, the first index Zp may be changed to "2." In addition, when the distances and velocities of different objects in the phase domain matrix by the second pre-chirp signal PCS2 are within the predetermined error range, the first index Zp may be changed to "1."

As described above, a pulse repetition interval PRI between a plurality of chirps or a pulse repetition frequency PRF of the plurality of chirps may be changed based on a possibility that the distances or velocities of different objects in the phase domain matrix by the pre-chirp signal overlap each other.

As another example, as illustrated in FIG. 11B, the radar 120 may become a "first mode" or a "second mode" according to a phase domain matrix by a main chirp signal. The first mode and the second mode are mutually exclusive, and the first mode and the second mode may not be satisfied simultaneously.

The radar 120 may transmit the first pre-chirp signal PCS1 and the first main chirp signal MCS1 in the first mode and also transmit the second pre-chirp signal PCS2 and the second main chirp signal MCS2 in the second mode.

The first mode and the second mode may be determined by a second index Zn. For example, as illustrated in FIG. 11B, when the second index Zn is "1," the radar 120 may maintain the first mode or may be switched from the second mode to the first mode. In addition, when the second index Zn is "2," the radar 120 may maintain the second mode or may be switched from the first mode to the second mode.

The second index Zn may be determined according to whether distances and velocities of different objects in the phase domain matrix by the main chirp signal overlap each other. For example, when the distances and velocities of different objects in the phase domain matrix by the first main chirp signal MCS1 are within a predetermined error range, the second index Zn may be changed to "2." In addition, when the distances and velocities of different objects in the phase domain matrix by the second main chirp signal MCS2 are within the predetermined error range, the second index Zn may be changed to "1."

As described above, a pulse repetition interval PRI between a plurality of chirps or a pulse repetition frequency PRF of the plurality of chirps may be changed based on a possibility that the distances or velocities of different objects in the phase domain matrix by the main chirp signal overlap each other.

As still another example, as illustrated in FIG. 11C, the radar 120 may become a "first mode," a "second mode," a "third mode," or a "fourth mode" according to a phase domain matrix by a main chirp signal. The first mode, the second mode, the third mode, and the fourth mode are mutually exclusive, and the first mode, the second mode, the third mode, and the fourth mode may not be satisfied simultaneously.

The radar 120 may transmit the first pre-chirp signal PCS1 and the first main chirp signal MCS1 in the first mode and the fourth mode and also transmit the second pre-chirp signal PCS2 and the second main chirp signal MCS2 in the second mode and the third mode.

The first mode, the second mode, the third mode, and the fourth mode may be determined by the second index Zn. For example, as illustrated in FIG. 11C, when the second index Zn is "1," the radar 120 may be switched from the third mode to the first mode or switched from the second mode to the third mode. In addition, when the second index Zn is "2," the radar 120 may be switched from the fourth mode to the second mode or switched from the first mode to the fourth mode.

In particular, when the second index Zn is "0," the radar 120 may be alternately switched to the third mode and the fourth mode. For example, when a current mode of the radar 120 is the third mode, a next mode of the radar 120 may become the fourth mode, and when the current mode of the radar 120 is the fourth mode, the next mode of the radar 120 may become the third mode.

The second index Zn may be determined according to whether the distances and velocities of different objects in the phase domain matrix by the main chirp signal overlap each other. For example, when all of the distances and velocities of different objects in the phase domain matrix by the first main chirp signal MCS1 or the second main chirp signal MCS2 are out of the predetermined error range, the second index Zn may be set to "0." When the distances and velocities of different objects in the phase domain matrix by the first main chirp signal MCS1 are within the predetermined error range, the second index Zn may be changed to "2." In addition, when the distances and velocities of different objects in the phase domain matrix by the second main chirp signal MCS2 are within the predetermined error range, the second index Zn may be changed to "1."

As described above, the pulse repetition interval PRI between the plurality of chirps or the pulse repetition frequency PRF of the plurality of chirps may be repeatedly changed.

As described above, the radar 120 may change the PRI of the chirp signal based on the possibility of the Doppler ambiguity in order to avoid a detection error due to the Doppler ambiguity. Specifically, the radar 120 may transmit the first pre-chirp signal PCS1 and the first main chirp signal MCS1 or transmit the second pre-chirp signal PCS2 and the second main chirp signal MCS2 based on the possibility of the Doppler ambiguity.

Figure 12:
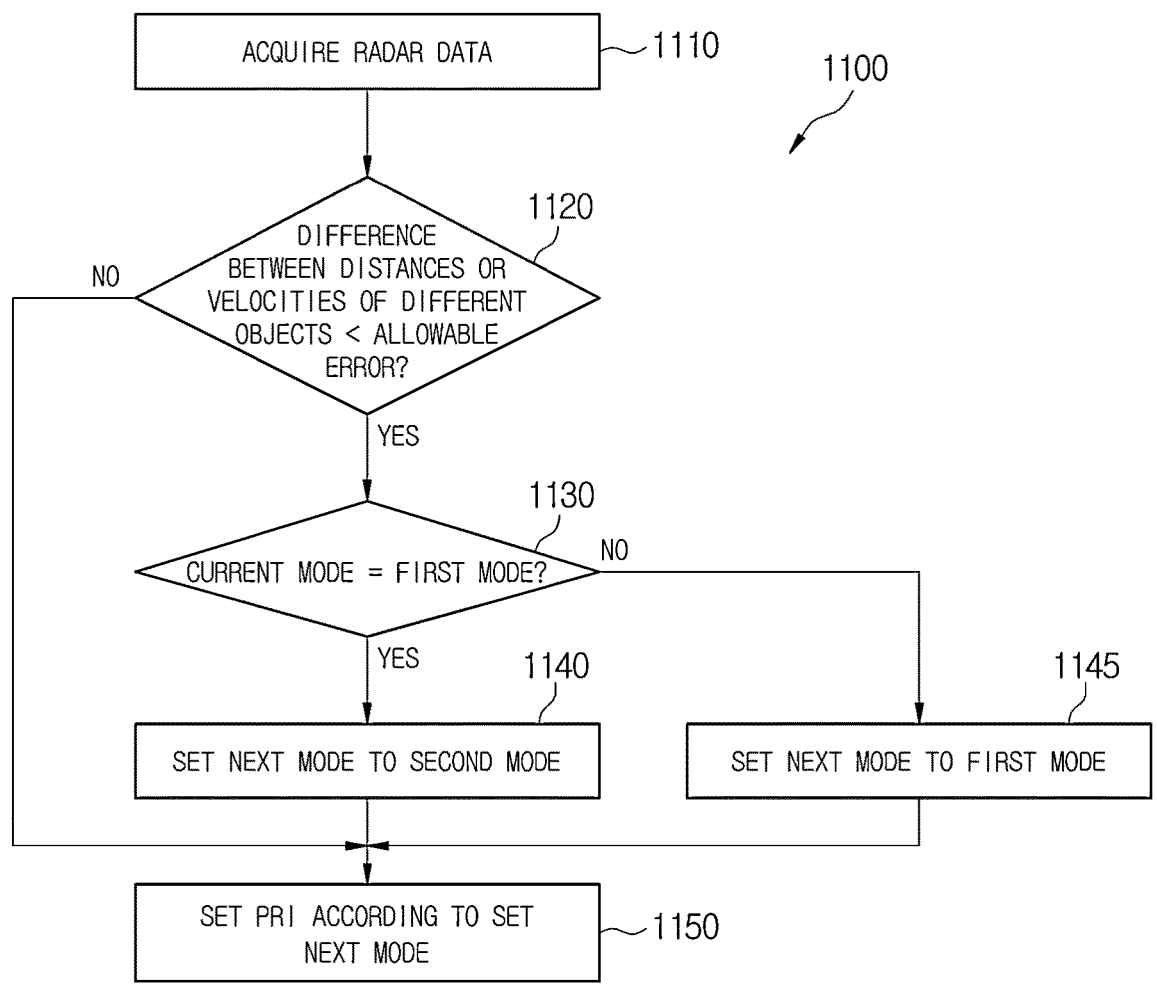
FIG. 12 is a view illustrating one example of a mode switching operation of the traveling assistance apparatus according to one embodiment.

FIG. 12 is a view illustrating one example of a mode switching operation of the traveling assistance apparatus according to one embodiment.

A mode switching operation 1100 of the traveling assistance apparatus 100 will be described with reference to FIG. 12.

The traveling assistance apparatus 100 may acquire radar data (1110).

For example, the radar 120 may acquire the intermediate frequency signal corresponding to the pre-chirp signal or the intermediate frequency signal corresponding to the main chirp signal from the signal processing circuit 200.

The traveling assistance apparatus 100 may identify whether the difference between the distances or velocities of different objects around the vehicle 1 is smaller than the allowable error (1120).

For example, the radar 120 may acquire the phase domain matrix by performing the two-dimensional FFT on the intermediate frequency signal corresponding to the pre-chirp signal or the intermediate frequency corresponding to the main chirp signal. The radar 120 may identify the distances and velocities of different objects based on the phase domain matrix. The radar 120 may identify whether the difference between the distances of different objects is smaller than the allowable error and identify whether the difference between the velocities of different objects is smaller than the allowable error.

When the difference between the distances or velocities of different objects is smaller than the allowable error (YES in 1120), the traveling assistance apparatus 100 may identify whether the current mode of the radar 120 is the first mode (1130). When the current mode of the radar 120 is the first mode (YES in 1130), the traveling assistance apparatus 100 may set the next mode to the second mode (1140).

For example, the radar 120 may change the first index Zp to "2" or change the second index Zn to "2" based on the current mode that is the first mode.

When the current mode of the radar 120 is not the first mode (NO in 1130), the traveling assistance apparatus 100 may set the next mode to the first mode (1145).

For example, the radar 120 may change the first index Zp to "1" or change the second index Zn to "1" based on the current mode that is the second mode.

The traveling assistance apparatus 100 may set the PRI (or PRF) according to the set next mode (1150).

For example, the radar 120 may set the PRI of the pre-chirp signal to the first PRI and set the PRI of the main chirp signal to the second PRI based on the next mode that is the first mode. In addition, the radar 120 may set the PRI of the pre-chirp signal to the third PRI and set the PRI of the main chirp signal to the fourth PRI based on the next mode that is the second mode.

In addition, when the difference between the distances or velocities of different objects is not smaller than the allowable error (NO in 1120), the traveling assistance apparatus 100 may set the PRI (or PRF) according to the set next mode (1150).

As described above, the traveling assistance apparatus 100 may change the operation mode of the radar 120 and change the PRI of the chirp signal based on the possibility of the Doppler ambiguity in order to avoid the detection error due to the Doppler ambiguity. Therefore, it is possible to suppress, prevent, or minimize the detection error of the object due to the Doppler ambiguity.

Figure 13:
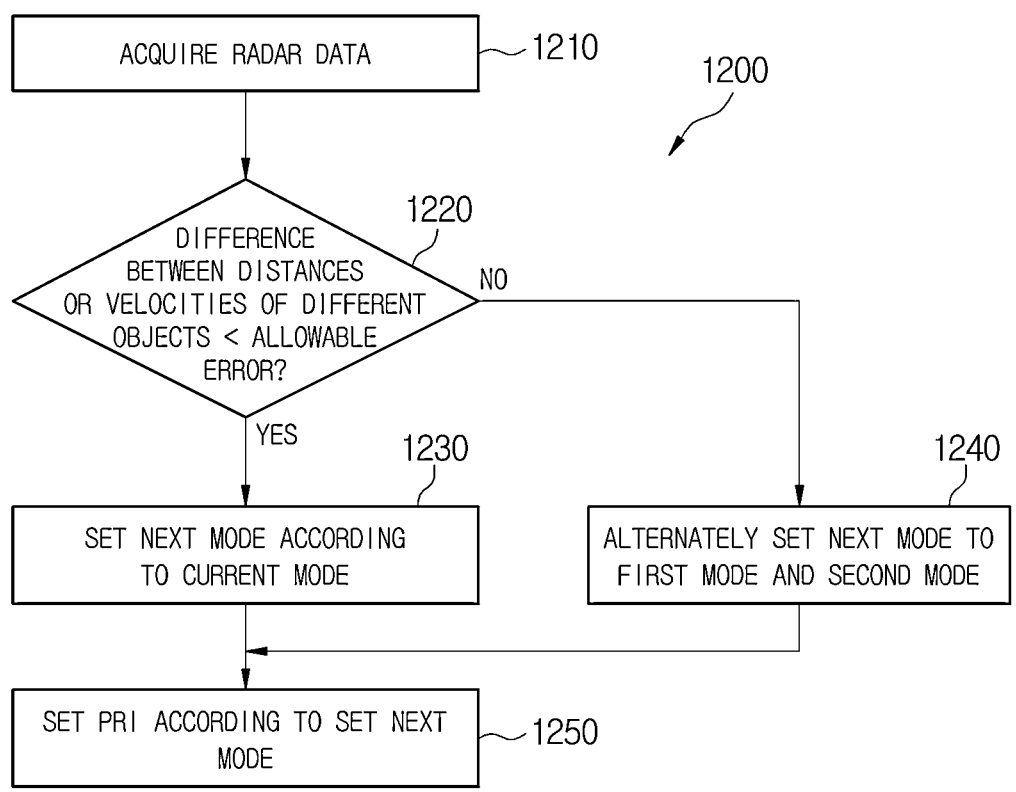
FIG. 13 is a view illustrating one example of a mode switching operation of the traveling assistance apparatus according to one embodiment.

FIG. 13 is a view illustrating one example of a mode switching operation of the traveling assistance apparatus according to one embodiment.

A mode switching operation 1300 of the traveling assistance apparatus 100 will be described with reference to FIG. 13.

The traveling assistance apparatus 100 may acquire radar data (1210). The traveling assistance apparatus 100 may identify whether the difference between the distances or velocities of different objects around the vehicle 1 is smaller than the allowable error (1220).

Operations 1210 and 1220 may be respectively the same as operations 1110 and 1120 described with reference to FIG. 12.

When the difference between the distances or velocities of different objects is smaller than the allowable error (YES in 1220), the traveling assistance apparatus 100 may set the next mode according to the current mode (1230).

For example, the radar 120 may set the second index Zn to "0," "1," or "2" according to the current mode. The radar 120 may set the second index Zn to "1" and set the next mode to the first mode based on the current mode that is the third mode. The radar 120 may set the second index Zn to "2" and set the next mode to the second mode based on the current mode that is the fourth mode. The radar 120 may set the second index Zn to "2" and set the next mode to the second mode based on the current mode that is the first mode. In addition, the radar 120 may set the second index Zn to "1" and set the next mode to the first mode based on the current mode that is the second mode.

When the difference between the distances or velocities of different objects is not smaller than the allowable error (NO in 1220), the traveling assistance apparatus 100 may alternately set the operation mode of the radar 120 to the third mode and the fourth mode (1240).

For example, the radar 120 may set the second index Zn to "0." When the second index Zn is "0," a mode of the radar 120 may be alternately switched to the third mode and the fourth mode. When the second index Zn is "0" and the current mode is the third mode, the radar 120 may set the next mode to the fourth mode. In addition, when the second index Zn is "0" and the current mode is the fourth mode, the radar 120 may set the next mode to the third mode.

The traveling assistance apparatus 100 may set the PRI (or PRF) according to the set next mode (1250).

For example, the radar 120 may set the PRI of the pre-chirp signal to the first PRI and set the PRI of the main chirp signal to the second PRI based on the next mode that is the first mode or the fourth mode. In addition, the radar 120 may set the PRI of the pre-chirp signal to the third PRI and set the PRI of the main chirp signal to the fourth PRI based on the next mode that is the second mode or the third mode.

As described above, the traveling assistance apparatus 100 may change the operation mode of the radar 120 and change the PRI of the chirp signal based on the possibility of the Doppler ambiguity in order to avoid the detection error due to the Doppler ambiguity. Therefore, it is possible to suppress, prevent, or minimize the detection error of the object due to the Doppler ambiguity.

As is apparent from the above description, it is possible to provide a traveling assistance apparatus including a radar and a method of controlling the same. Therefore, the traveling assistance apparatus can correct a phase error of a radar signal.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for driver assistance, the apparatus comprising:
    a radar installed on a vehicle, having a sensing area outside the vehicle, and configured to provide object data; and
    a controller configured to identify a distance to an object around the vehicle and a moving velocity of the object based on processing the object data,
    wherein the radar comprises:
        an antenna array, and
        a processor configured to provide the antenna array with a first pre-chirp signal corresponding to a plurality of first pre-chirps and a first main chirp signal corresponding to a plurality of first main chirps, and provide the antenna array with a second pre-chirp signal corresponding to a plurality of second pre-chirps and a second main chirp signal corresponding to a plurality of second main chirps based on overlapping distances or velocities of different objects identified by the first pre-chirp signal or the first main chirp signal,
    a time interval between the plurality of second pre-chirps is different from a time interval between the plurality of first pre-chirps, and
    a time interval between the plurality of second main chirps is different from a time interval between the plurality of first main chirps.

2. The apparatus of claim 1, wherein the time interval between the plurality of first pre-chirps is different from the time interval between the plurality of first main chirps, and
    the time interval between the plurality of second pre-chirps is different from the time interval between the plurality of second main chirps.

3. The apparatus of claim 1, wherein the processor is further configured to:
    identify a distance or velocity of each of the different objects based on a first pre-intermediate frequency signal corresponding to the first pre-chirp signal; and
    provide the second pre-chirp signal and the second main chirp signal to the antenna array when one or more of the distances or velocities of the different objects overlap.

4. The apparatus of claim 1, wherein the processor is further configured to:
    identify a distance or velocity of each of the different objects based on a first main intermediate frequency signal corresponding to the first main chirp signal; and
    provide the second pre-chirp signal and the second main chirp signal to the antenna array when one or more of the distances or velocities of the different objects overlap.

5. The apparatus of claim 1, wherein the processor is further configured to alternately perform providing the first pre-chirp signal and the first main chirp signal to the antenna array and providing the second pre-chirp signal and the second main chirp signal to the antenna array.

6. The apparatus of claim 1, wherein a frequency of the first pre-chirp signal changes depending on each of the plurality of first pre-chirps,
    a frequency of the first main chirp signal changes depending on each of the plurality of first main chirps,
    a frequency of the second pre-chirp signal changes depending on each of the plurality of second pre-chirps, and
    a frequency of the second main chirp signal changes depending on each of the plurality of second main chirps.

7. The apparatus of claim 1, wherein the processor is further configured to:
    provide the object data including the distance or the moving velocity of the object based on a first pre-intermediate frequency signal corresponding to the first pre-chirp signal; and
    provide a bin mask corresponding to at least one bin not including data on the distance of the object.

8. The apparatus of claim 7, wherein the processor is further configured to:
    transform the first pre-intermediate frequency signal into first frequency domain data through a first Fast Fourier Transform;
    transform the first frequency domain data into first phase domain data through a second Fast Fourier Transform; and
    provide the object data including the distance and the moving velocity of the object based on the first phase domain data.

9. The apparatus of claim 7, wherein the processor is further configured to:
    filter a second main intermediate frequency signal corresponding to the second main chirp signal using the bin mask; and
    provide the object data including the distance or the moving velocity of the object based on the filtered intermediate frequency signal.

10. The apparatus of claim 9, wherein the processor is further configured to:
    transform the second pre-intermediate frequency signal into second frequency domain data through a first Fast Fourier Transform;

transform the second frequency domain data into second phase domain data through a second Fast Fourier Transform; and provide the object data including the distance and the moving velocity of the object based on the second phase domain data.

11. A method of controlling an apparatus for driver assistance including an antenna array installed on a vehicle and having a sensing area outside the vehicle, the method comprising:

providing the antenna array with a first pre-chirp signal corresponding to a plurality of first pre-chirps and a first main chirp signal corresponding to a plurality of first main chirps; and providing the antenna array with a second pre-chirp signal corresponding to a plurality of second pre-chirps and a second main chirp signal corresponding to a plurality of second main chirps based on overlapping distances or velocities of different objects identified by the first pre-chirp signal or the first main chirp signal, wherein a time interval between the plurality of second pre-chirps is different from a time interval between the plurality of first pre-chirps, and a time interval between the plurality of second main chirps is different from a time interval between the plurality of first main chirps.

12. The method of claim 11, wherein the time interval between the plurality of first pre-chirps is different from the time interval between the plurality of first main chirps, and the time interval between the plurality of second pre-chirps is different from the time interval between the plurality of second main chirps.

13. The method of claim 11, wherein the providing of the second pre-chirp signal and the second main chirp signal to the antenna array includes:

identifying a distance or a velocity of each of the different objects based on a first pre-intermediate frequency signal corresponding to the first pre-chirp signal; and providing the second pre-chirp signal and the second main chirp signal to the antenna array when one or more of the distances or velocities of the different objects overlap.

14. The method of claim 11, wherein the providing of the second pre-chirp signal and the second main chirp signal to the antenna array includes:

identifying a distance or a velocity of each of the different objects based on a first main intermediate frequency signal corresponding to the first main chirp signal; and providing the second pre-chirp signal and the second main chirp signal to the antenna array when one or more of the distances or velocities of the different objects overlap.

15. The method of claim 11, further comprising alternately performing providing the antenna array with the first pre-chirp signal and the first main chirp signal and providing the antenna array with the second pre-chirp signal and the second main chirp signal.

16. The method of claim 11, wherein a frequency of the first pre-chirp signal changes depending on each of the plurality of first pre-chirps, a frequency of the first main chirp signal changes depending on each of the plurality of first main chirps, a frequency of the second pre-chirp signal changes depending on each of the plurality of second pre-chirps, and a frequency of the second main chirp signal changes depending on each of the plurality of second main chirps.

17. The method of claim 11, further comprising:

providing object data including a distance or a velocity of the object based on a first pre-intermediate frequency signal corresponding to the first pre-chirp signal; and providing a bin mask corresponding to at least one bin not including data on the distance of the object.

18. The method of claim 17, wherein the providing of the object data including the distance or the velocity of the object includes:

transforming the first pre-intermediate frequency signal into first frequency domain data through a first Fast Fourier Transform;

transforming the first frequency domain data into first phase domain data through a second Fast Fourier Transform; and providing the object data including the distance and the velocity of the object based on the first phase domain data.

19. The method of claim 17, further comprising:

filtering a second main intermediate frequency signal corresponding to the second main chirp signal using the bin mask; and providing the object data including the distance or the velocity of the object based on the filtered intermediate frequency signal.

20. The method of claim 19, wherein the providing of the object data including the distance or the velocity of the object includes:

transforming the second pre-intermediate frequency signal into second frequency domain data through a first Fast Fourier Transform;

transforming the second frequency domain data into second phase domain data through a second Fast Fourier Transform; and providing the object data including the distance and the velocity of the object based on the second phase domain data.

* * * * *